US007150769B2

(12) United States Patent
Sakurai et al.

(10) Patent No.: US 7,150,769 B2
(45) Date of Patent: Dec. 19, 2006

(54) FUEL REFORMING APPARATUS AND METHOD

(75) Inventors: Kazuhiro Sakurai, Gotemba (JP); Kazuhiro Wakao, Susono (JP); Tetsuzou Tsuchiya, Gotemba (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/917,480

(22) Filed: Aug. 13, 2004

(65) Prior Publication Data

US 2005/0053531 A1 Mar. 10, 2005

(30) Foreign Application Priority Data

Sep. 5, 2003 (JP) .............................. 2003-314367
Apr. 21, 2004 (JP) .............................. 2004-126029

(51) Int. Cl.
*C01B 3/32* (2006.01)

(52) U.S. Cl. ........................ 48/198.7; 48/127.9; 48/128

(58) Field of Classification Search ............... 48/127.9, 48/128, 198.7
See application file for complete search history.

(56) References Cited

U.S. PATENT DOCUMENTS 3,594,983 A * 7/1971 Yearout .......................... 95/97
5,235,804 A * 8/1993 Colket et al. .................. 60/780
5,437,250 A 8/1995 Rabinovich et al.
5,943,859 A 8/1999 Kawamura
2003/0126989 A1 * 7/2003 Bancon et al. ................. 95/96
2003/0143442 A1 7/2003 Daniel et al.

FOREIGN PATENT DOCUMENTS

DE 26 18 961 A 11/1976
JP A 4-58064 2/1992
JP A 2000-153156 6/2000

* cited by examiner

*Primary Examiner*—N. Bhat
(74) *Attorney, Agent, or Firm*—Oliff & Berridge, PLC

(57) ABSTRACT

A fuel reforming apparatus includes a reforming reaction section in which a reforming catalyst is disposed, and a reformed fuel distribution chamber. A fuel air mixture of a hydrocarbon fuel and air is reformed in the reforming reaction section. The reformed fuel is supplied from the reformed fuel distribution chamber to chambers of the engine. The adsorbent member is disposed between the reforming reaction section and the reformed fuel distribution chamber. The adsorbent member captures a non-reformed fuel.

12 Claims, 18 Drawing Sheets

FUEL REFORMING APPARATUS AND METHOD

This application claims priority from Japanese Patent Application Nos. 2003-314367 filed Sep. 5, 2003 and 2004-126029 filed Apr. 21, 2004, which are incorporated hereinto by reference.

BACKGROUND OF THE INVENTION

1. Field of the Invention

The present invention relates to a fuel reforming apparatus and method for reforming a fuel air mixture of a fuel and air.

2. Description of the Related Art

For example, Japanese Patent Application Laid-open No. 4-058064 (1992) discloses an engine with a reforming catalyst. In this engine, the reforming catalyst is disposed upstream of a fuel injection valve within an intake pipe. Further, a fuel feeding valve, an ultrasonic atomizer (an ultrasonic oscillation member), an igniter and a flame extinguisher are disposed upstream of the reforming catalyst within the intake pipe. When the engine is started, a hydrocarbon fuel is fed from the fuel feeding valve to the ultrasonic sprayer and is atomized into micro droplets by the ultrasonic atomizer. The hydrocarbon fuel is ignited by the igniter and burns. Flames generated in the intake pipe are extinguished by the flame extinguisher. Then, a heated fuel air mixture is introduced into the reforming catalyst in which a fuel component to be sucked into a combustion chamber is obtained by a predetermined reforming reaction.

However, even if the fuel air mixture is formed by atomizing the hydrocarbon fuel into micro-droplets as described above, it is difficult to uniformly mix the fuel and air. If a nonuniform fuel air mixture is fed to the reforming catalyst, an amount of non-reformed fuel (non-reformed HC) increases. The non-reformed fuel is fed to the combustion chamber while not reformed by the reforming catalyst increases. If the amount of the non-reformed fuel fed to the combustion chamber increases in such a manner, it is difficult to reduce an exhaust emission.

SUMMARY OF THE INVENTION

The present invention is directed to overcome one or more of the problems as set forth above.

One aspect of the present invention relates to a fuel reforming apparatus for reforming a fuel air mixture of a fuel and air. The apparatus comprises: a reforming catalyst for reforming the fuel air mixture; a reformed fuel supply section for supplying a reformed fuel produced by the reforming catalyst to a predetermined object; and capturing means for capturing a non-reformed fuel, the capturing means being disposed between the reforming catalyst and the reformed fuel supply section.

Another aspect of the present invention relates to a method of reforming a fuel air mixture of a fuel and air with a reforming catalyst. The method comprises the step of: capturing a non-reformed fuel with an adsorbent material between the reforming catalyst and a reformed fuel supply section for supplying a reformed fuel produced by the reforming catalyst to a predetermined object.

The above and other objects, effects, features and advantages of the present invention will become more apparent from the following description of embodiments thereof taken in conjunction with the accompanying drawings.

DETAILED DESCRIPTION OF PREFERRED EMBODIMENTS

Figure 1:
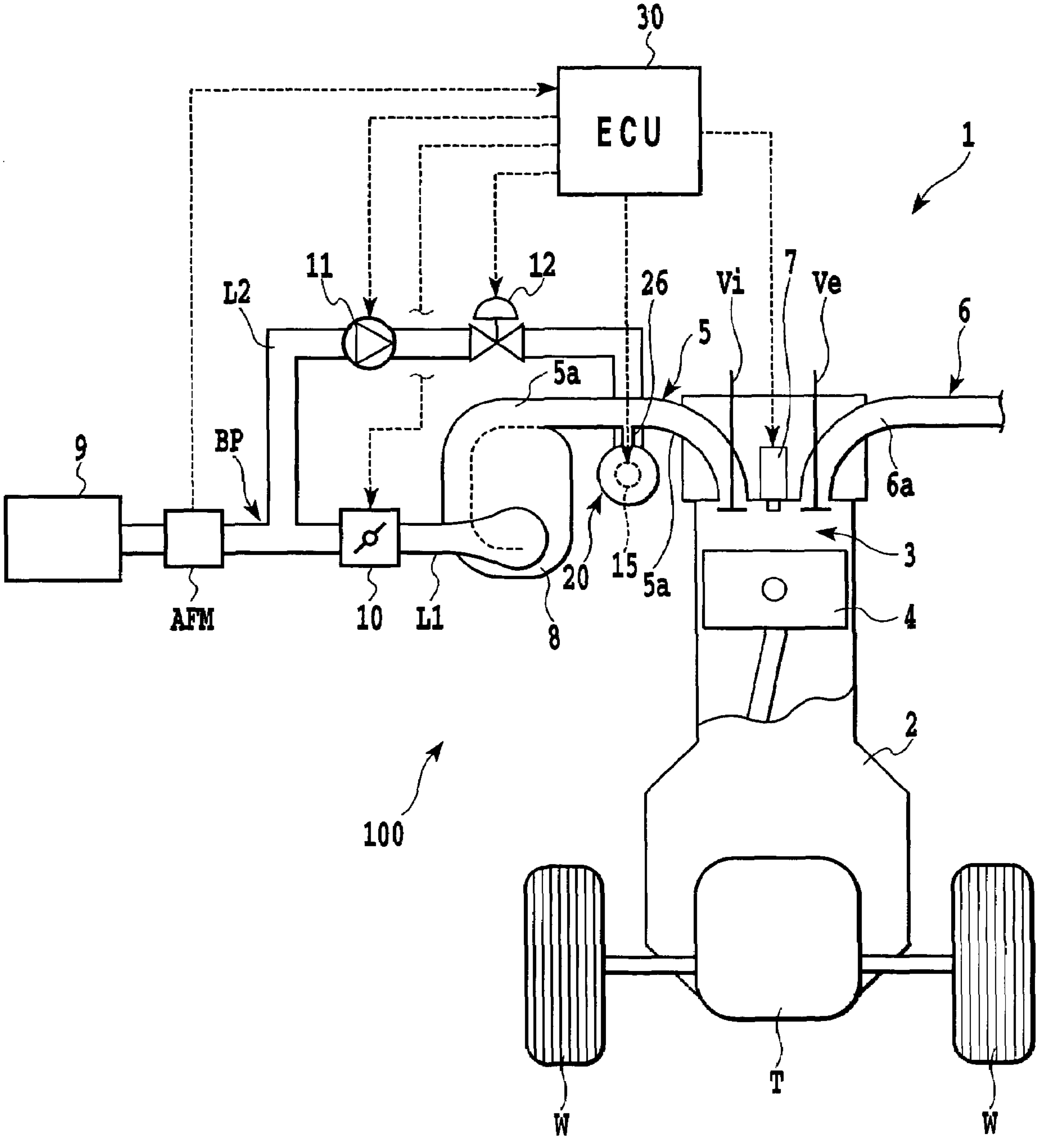
FIG. 1 is a schematic illustration of a vehicle with a fuel reforming apparatus according to a first embodiment of the present invention.

In the fuel reforming apparatus according to the present invention, a non-reformed fuel (non-reformed HC) is captured by capturing means between a reforming catalyst and a reformed fuel supply section. Accordingly, it is possible to prevent the non-reformed fuel from being supplied to an object such as an internal combustion engine (a combustion chamber) and the like, and to reduce an exhaust emission.

Preferably, the fuel reforming apparatus of the present invention further includes cooling means for cooling the reformed fuel between the reforming catalyst and the capturing means.

Preferably, the capturing means is disposed in an outer region of a passage connecting the reforming catalyst and the reformed fuel supply section.

The fuel reforming apparatus of the present invention may further includes a first passage connecting the reforming catalyst and the reformed fuel supply section, a second passage bypassing part of the first passage and connecting the reforming catalyst and the reformed fuel supply section, and opening/closing means for opening and closing the first passage. In such a configuration, the capturing means is disposed in the second passage and includes an adsorbent material for adsorbing the non-reformed fuel. When an operation of the fuel reforming apparatus is started, the opening/closing means is closed so that the reformed fuel is led from the reforming catalyst only into the second passage.

Since a much amount of the non-reformed fuel generally generated immediately after a start-up of the fuel reforming apparatus is captured by the adsorbent material disposed in the second passage, it is possible to prevent the non-reformed fuel from being supplied to an object such as an internal combustion engine. Also, if an operational condition of the fuel reforming apparatus is stable, an amount of non-reformed fuel reduces and the non-reformed fuel adsorbed in the adsorbent material is released from the adsorbent material as a temperature of the adsorbent material rises. Therefore, in this fuel reforming apparatus, at a stage in which the operation of the fuel reforming apparatus becomes stable, the opening/closing means is gradually made to open so that a flow rate of the reformed fuel through the second passage is reduced. Accordingly, it is possible to gradually release the non-reformed fuel from the adsorbent material while taking a long time.

Preferably, the second passage connects a portion of the first passage upstream of the opening/closing means and a portion of the first passage downstream of the opening/closing means.

The second passage may surround the first passage.

Preferably, the opening/closing means is closed from a start of a fuel reforming operation in the reforming catalyst until a predetermined period has lapsed or until the adsorbent material has reached a predetermined temperature.

Preferably, the fuel reforming apparatus of the present invention further includes non-reformed fuel recovering means for recovering the non-reformed fuel captured by the capturing means and supplying the non-reformed fuel to the reforming catalyst again. Thus, it is possible to surely prevent the non-reformed fuel from being supplied to an object such as an internal combustion engine, and to recover the non-reformed fuel captured by the capturing means and effectively use the non-reformed fuel again.

Preferably, the non-reformed fuel recovering means includes negative pressure generating means for generating a negative pressure by using a flow of air supplied to the reforming catalyst, and a passage connecting the negative pressure generating means and the capturing means.

The fuel reforming apparatus of the present invention may further include heat exchanging means having a reformed fuel passage for leading the reformed fuel from the reforming catalyst to the reformed fuel supply section and a heating medium passage for circulating a heating medium to exchange heat between the heating medium and the reformed fuel flowing the reformed fuel passage, and adsorbent material for adsorbing the non-reformed fuel disposed as the capturing means in the reformed fuel passage of the heat exchanging means.

In such a configuration, the heating medium (coolant) flowing through the heating medium passage of the heat exchanging means can adsorb heat from the reformed fuel flowing through the reformed fuel passage, so that a temperature rise of the adsorbent material due to heat of the reformed fuel can be prevented. According to such a configuration, it is possible to release the non-reformed fuel from the adsorbent material little by little as the time lapses.

Preferably, the predetermined object is a combustion chamber of an internal combustion engine and the heating medium is part of air supplied to said combustion chamber.

The method of the present invention is a method of reforming a fuel air mixture of a fuel and air with a reforming catalyst, the method including the step of: capturing a non-reformed fuel with an adsorbent material between the reforming catalyst and a reformed fuel supply section for supplying a reformed fuel produced by the reforming catalyst to a predetermined object.

Preferably, the method of the present invention includes the step of cooling the reformed fuel between the reforming catalyst and the capturing means. Preferably, the method further includes the step of recovering the non-reformed fuel captured by the adsorbent material and supplying the non-reformed fuel to the reforming catalyst again.

Preferred embodiments according to the present invention will now be described with reference to drawings.

(First Embodiment)

FIG. 1 is a schematic illustration of a vehicle with a fuel reforming apparatus according to the present invention. The vehicle 100 shown in FIG. 1 has an engine (internal combustion engine) 1 as a power unit. The engine 1 generates power by combustion of a fuel air mixture containing a fuel component in combustion chambers 3 formed in a cylinder block 2 to reciprocate a piston 4 in the respective combustion chambers. In this embodiment, the engine 1 is configured as a four-cylinder engine as seen from FIG. 2 (in FIG. 1, however, only one cylinder is shown).

An intake port of each combustion chamber 3 is connected to an intake pipe 5*a* constituting an intake manifold 5, while an exhaust port of each combustion chamber 3 is connected to an exhaust pipe 6*a* constituting an exhaust manifold 6. Also, in a cylinder head of the engine 1, an intake valve Vi for opening and closing the intake port and an exhaust valve Ve for opening and closing the exhaust port are disposed with respect to each of the respective combustion chambers 3. The intake valves Vi and the exhaust valves Ve are operated by a valve-operating mechanism (not shown) preferably having a variable valve-timing function. Further, in the cylinder head of the engine 1, an ignition plug 7 is disposed with respect to each of the combustion chambers 3. Also, the exhaust manifold 6 is connected to a catalyst unit (a three-way catalyst) not shown.

Figure 2:
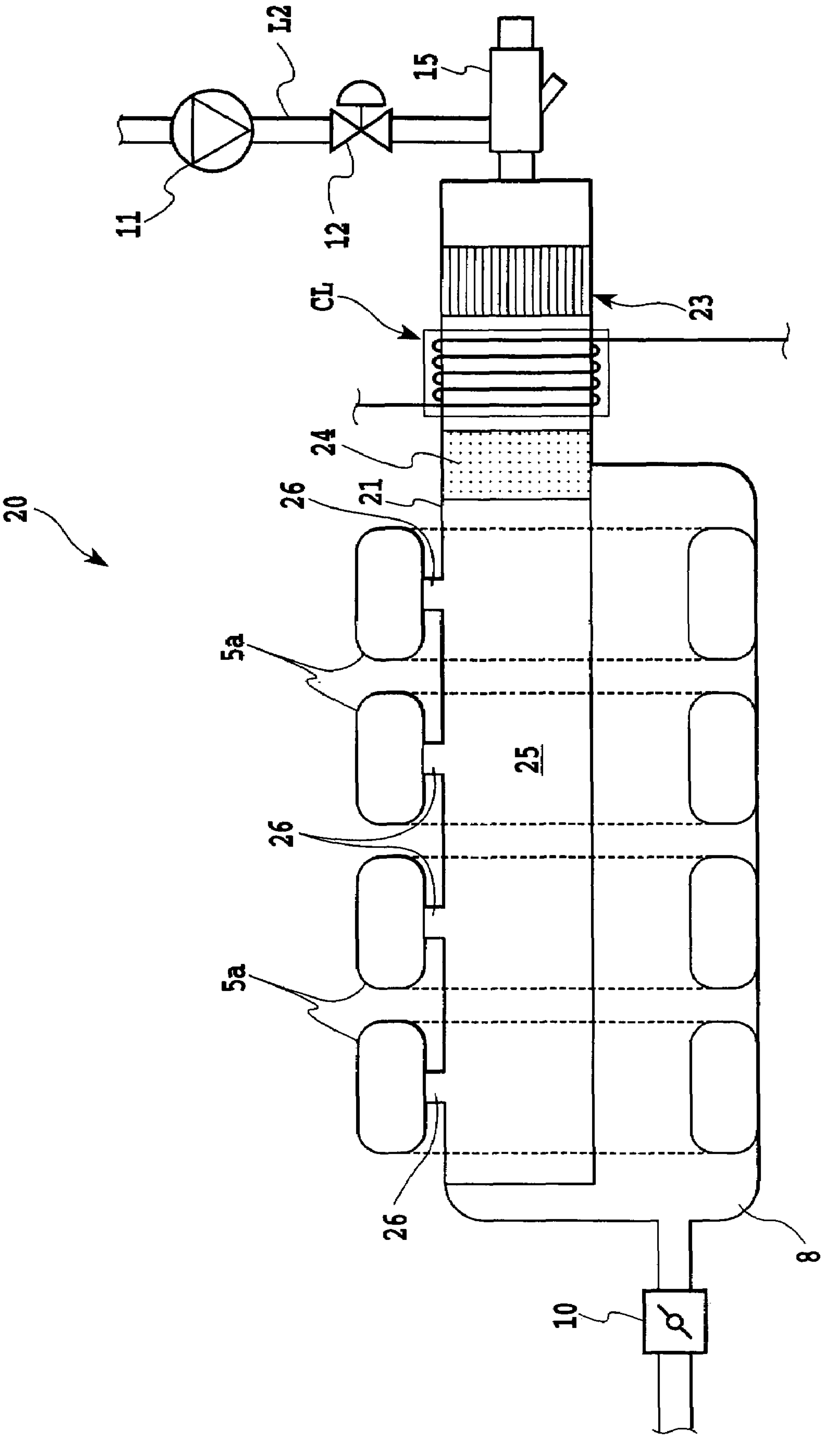
FIG. 2 is a schematic illustration of the fuel reforming apparatus according to the first embodiment of the present invention.

As seen from FIGS. 1 and 2, the intake manifold 5 (respective intake pipes 5*a*) is connected to a surge tank 8, and the intake manifold 5 and the surge tank 8 constitute an air intake system of the engine 1. Also, an air supply pipe L1 is connected to the surge tank 8. The air supply pipe L1 is connected to an air inlet not shown via an air cleaner 9. A throttle valve (an electronic throttle valve in this embodiment) 10 is incorporated in the air supply pipe L1 between the surge tank 8 and the air cleaner 9.

Further, the air supply pipe L1 is provided with an air flow meter AFM which is located between the air cleaner 9 and the throttle valve 10. A reforming air supply pipe (air supply line) L2 is branched from the air supply pipe L1 at a branched point BP positioned between the throttle valve 10 and the air flow meter AFM. The reforming air supply pipe L2 has an air pump 11 and an on-off valve or a shut off valve 12 in this order from the branching point BP. A front end (an end opposite to the branching point BP) of the reforming air supply pipe L2 is connected to a fuel reforming apparatus (fuel reformer) 20. In addition, as the on-off valve 12, a electromagnetic valve or a motorized valve may be adopted.

As shown in FIG. 2, the fuel reforming apparatus 20 has a tubular body 21 closed at opposite ends thereof. An fuel injection valve 15 is connected to one end of the body 21 (a right end in FIG. 2). The fuel injection valve 15 is connected to a fuel tank via a fuel pump (not shown respectively) and is capable of injecting a hydrocarbon fuel such as gasoline into the interior of the body 21.

Figure 3:
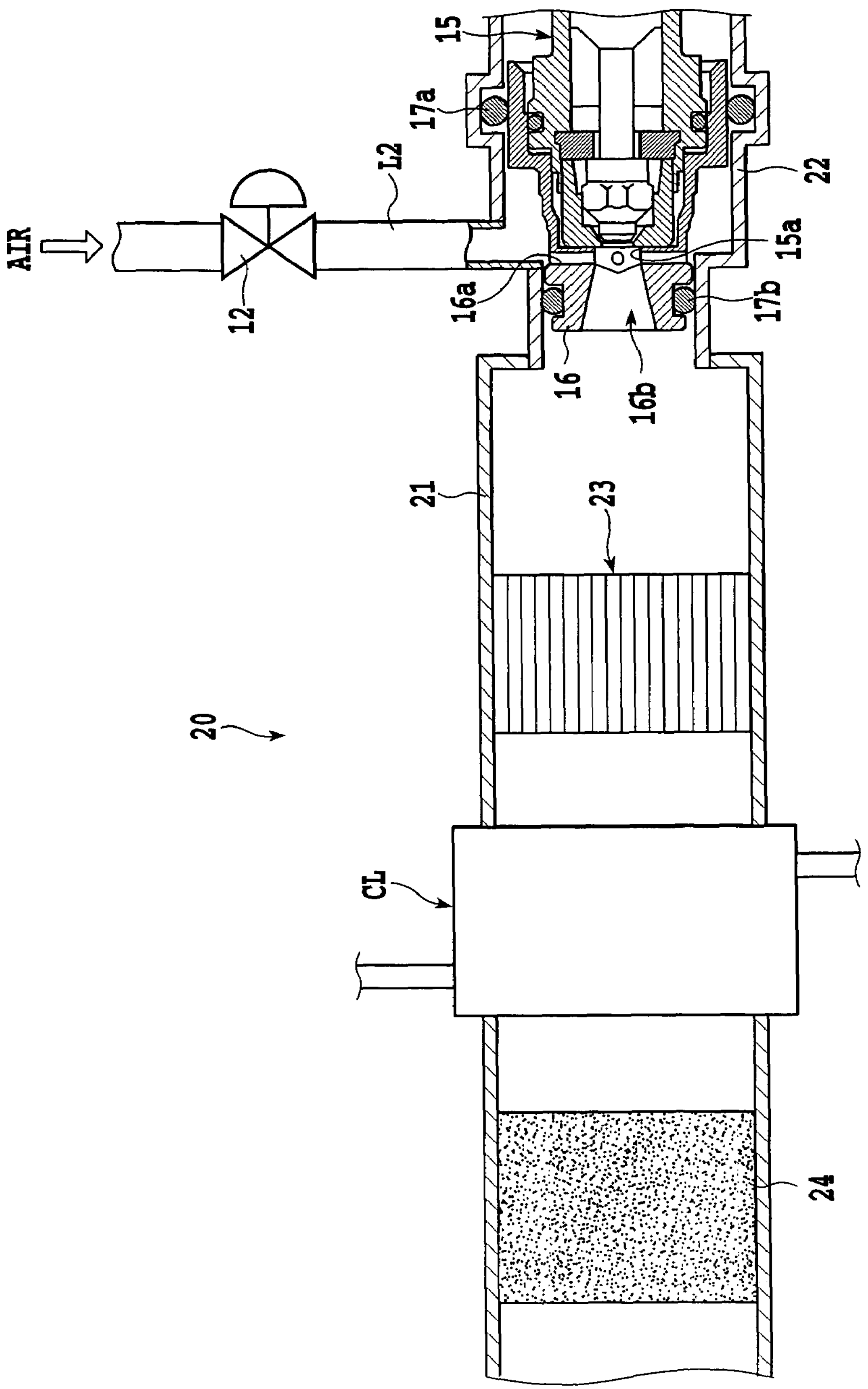
FIG. 3 is a partially sectional view of the fuel reforming apparatus shown in FIGS. 1 and 2.

As shown in FIG. 3, the fuel injection valve 15 is disposed within a valve accommodating section 22 connected to the body 21 of the fuel reforming apparatus 20. A front end of the reforming air supply pipe L2 including the air pump 11 and the on-off valve 12 is connected to the valve accommodating section 22, so that air is blown in the vicinity of a fuel injection outlet 15*a* of the fuel injection valve 15 in the valve accommodating section 22. That is, the reforming air supply pipe L2 is connected to the valve accommodating section 22 so that air is blown to the fuel injection valve 15 (the fuel injection outlet 15*a*) in the lateral direction.

Also, a nozzle member 16 is connected to a tip of the fuel injection valve 15. The nozzle member 16 has a plurality of air ejection outlets 16*a* extending radially, and an air-fuel mixing chamber 16*b* extending axially and communicating with the respective air ejection outlets 16*a*. The air-fuel mixing chamber 16*b* of the nozzle member 16 is communicated with the interior of the body 21 of the fuel reforming apparatus 20 as shown in FIG. 3. O-rings 17*a*, 17*b* are interposed between the valve accommodating section 22 and the fuel injection valve 15 as well as the nozzle member 16 for preventing the fuel or air from leaking outside.

On the other hand, a reforming reaction section 23 is defined in the interior of the body 21 of the fuel reforming apparatus 20. A reforming catalyst, for example, carrying rhodium on zirconium oxide is disposed in the reforming reaction section 23. As shown in FIG. 2, a cooler CL including a heat transfer tube wound around the body 21 is disposed downstream of the reforming reaction section 23. In addition, the cooler CL may be omitted. Further, an adsorbent member (capturing means) 24 is disposed downstream of the cooler CL in the interior of the body 21 of the fuel reforming apparatus 20. The adsorbent member 24 is obtained by coating adsorbent material (such as zeolite) for adsorbing the hydrocarbon component (non-reformed HC) on a honeycomb member. A reformed fuel distribution chamber (a reformed fuel supply section) 25 is defined downstream of the adsorbent member 24 in the interior of the body 21 of the fuel reforming apparatus 20. That is, in the fuel reforming apparatus 20, the adsorbent member 24 is disposed between the reforming reaction section (reforming catalyst) 23 and the reformed fuel distribution chamber 25.

As shown in FIGS. 1 and 2, conduits 26 corresponding to the number of the combustion chambers 3 in the engine 1 (four in this embodiment) are connected to the reformed fuel distributing chamber 25 in the body 21 of the fuel reforming apparatus 20. An end of the respective conduits 26 is connected to the corresponding one intake pipe 5*a* as shown in FIGS. 1 and 2. Thus, the intake port of the respective combustion chambers 3 of the engine 1 is communicated with the interior of the reformed fuel distribution chamber 25 via the intake pipe 5*a* and the pipe 26.

As shown in FIG. 1, the engine 1 of the vehicle 100 is provided with a electronic control unit (hereinafter referred to as "ECU") 30 serving as control means. The ECU 30 includes CPU, ROM, RAM, input/output interfaces, memories (storage devices) and the like (not shown). The above-mentioned ignition plugs (igniter) 7, the valve operating mechanism, the throttle valve 10, the air pump 11, the on-off valve 12, the fuel injection valve 15, the air flow meter AFM and the like are connected to the ECU 30 (input/output interfaces). The ECU 30 controls these instruments based on signals from various sensors for detecting an operational condition of the engine 1 and/or in accordance with various control programs or maps.

When the above described vehicle 100 is made to operate, the ECU 30 makes the fuel injection valve 15 operate to start a fuel injection to the fuel reforming apparatus 20. Almost simultaneously therewith, the ECU 30 makes the on-off valve 12 open and makes the air pump 11 operate, so that air is supplied from the reforming air supply pipe L2 to the fuel reforming apparatus 20. The air pump 11 sucks air from the air supply pipe L1 and discharges the air. Air discharged from the air pump 11 is sent in the vicinity of the fuel injection outlet 15*a* of the fuel injection valve 15 in the valve accommodating section 22 through the reforming air supply pipe L2, and reaches the air-fuel mixing chamber 16*b* via the respective air ejection outlets 16*a*. Air from the reforming air supply pipe L2 is mixed with the fuel injected from the fuel injection outlets 15*a* in the air-fuel mixing chamber 16*b* of the nozzle member 16, so that the a air mixture flows into the body 21 of the fuel reforming apparatus 20.

The fuel air mixture introduced into the interior of the body 21 flows into the reforming reaction section 23. In the reforming reaction section 23, the hydrocarbon fuel and air are reacted each other by the reforming catalyst, so that the partially oxidation reaction represented by the following equation (1) is proceeded.

$$C_mH_n + \frac{m}{2}\cdot O_2 \rightarrow m\cdot CO + \frac{n}{2}\cdot H_2 \quad (1)$$

As the reaction of the above equation proceeds, the reformed fuel (reformed gas) containing fuel components of CO and $H_2$ is produced.

Now, it is not easy to uniformly mix the hydrocarbon fuel with air in the air-fuel mixing chamber 16*b* of the nozzle member 16 even in the fuel reforming apparatus 20. Particularly, immediately after a start-up of the fuel reforming apparatus 20, the supply of air to the air-fuel mixing chamber 16*b* becomes unstable, and nonuniform fuel air mixture may be supplied from the air-fuel mixing chamber 16*b* of the nozzle member 16 into the reforming reaction section 23. Therefore, an amount of non-reformed fuel (non-reformed HC) flowing out from the reforming reaction section 23 is liable to increase immediately after the start of the fuel reforming operation. In this embodiment, such a non-reformed fuel (non-reformed HC) contained in the reformed fuel is captured (adsorbed) between the reforming reaction section (reforming catalyst) 23 and the reformed fuel distribution chamber 25 by the adsorbent member 24 serving as capturing means. Particularly, since a temperature of the adsorbent member 24 is lowered approximately to an outer air temperature immediately after the start of the fuel reforming operation, the non-reformed fuel is surely captured (adsorbed) by the adsorbent member 24.

On the contrary, the reformed fuel (CO and $H_2$) obtained in the reforming reaction section 23 passes through the adsorbent member 24 without being adsorbed thereby, and is supplied from the reformed fuel distribution chamber 25 to the interior of each intake pipe 5*a* via the conduit 26. Moreover, air is introduced into the surge tank 8 via the throttle valve 10 in the air supply pipe L1 which opening degree is controlled by the ECU 30, and the air in the surge tank 8 is distributed to the respective intake pipes 5*a*. Accordingly, the reformed fuel introduced from the reformed fuel distribution chamber 25 into each intake pipe 5*a* is mixed with air in the intake pipe 5*a* and then sucked into the respective combustion chambers 3. In this embodiment, since air to be supplied to the fuel reforming apparatus 20 is taken from the air supply pipe L1 at a point downstream of the air flow meter AFM, a measurement value of the air flow meter AFM indicates a total amount of air sucked into the engine 1, so that the air-fuel ratio in the respective combustion chambers 3 can be favorably controlled.

When the fuel air mixture of the reformed fuel and air is supplied to the respective combustion chambers 3 and the ignition plugs 7 are discharged at a predetermined timing, the fuel component CO and $H_2$ burns to reciprocate the piston 4. Thus, the engine 1 operates to rotate wheels W via a trans-axle T including a torque converter, a transmission gear box, a differential mechanism and the like. At this time, according to the fuel reforming apparatus 20, since the supply of the non-reformed fuel to the respective combustion chambers 3 of the engine 1 is surely prevented, it is possible to reduce an exhaust emission and to enlarge a lean combustion range so as to prevent NOx from increasing and a fuel consumption rate from deteriorating.

The non-reformed fuel (non-reformed HC) adsorbed in the adsorbent member 24 as described above is released from the adsorbent member 24 as the temperature of the adsorbent member 24 rises, and introduced into the respective combustion chambers 3 via the reformed fuel distribution chamber 25, the conduit 26, the intake pipe 5*a* and the like. In this embodiment, the cooler CL is disposed between the reforming reaction section 23 and the adsorbent member 24 to cool the reformed fuel flowing from the reforming reaction section 23 to the adsorbent member 24. That is, the reformed fuel of which temperature rises due to the reforming reaction in the reforming reaction section 23 is cooled by the cooler CL, and then, made to pass through the adsorbent member 24, so that a temperature rise of the adsorbent member 24 due to heat of the reformed fuel from the reforming reaction section 23 is eased (controlled). As a result, since the non-reformed fuel is released from adsorbent member 24 little by little as the time lapses, HC or others can be prevented from being discharged from the engine 1.

In addition, a coolant flowing through a heating tube of the cooler CL is preferably an engine coolant. If the engine coolant is used as the coolant for the cooler CL, it is possible to sufficiently cool the reformed fuel from the reforming reaction section 23 since the temperature of the engine coolant is enough low to favorably maintain a capacity of the adsorbent member 24 for adsorbing the non-reformed fuel when the fuel reforming apparatus 20 (the engine 1) is made to start. Further, if the engine coolant is used as the coolant for the cooler CL, since the temperature of the engine coolant rises as the engine 1 becomes warmer, the reformed fuel from the reforming reaction section 23 is not continuously excessively cooled. Thus, it is possible to release the non-reformed fuel from the adsorbent member 24 when the operation of the fuel reforming apparatus 20 and the combustion in the respective combustion chambers 3 are stable.

Figure 4:
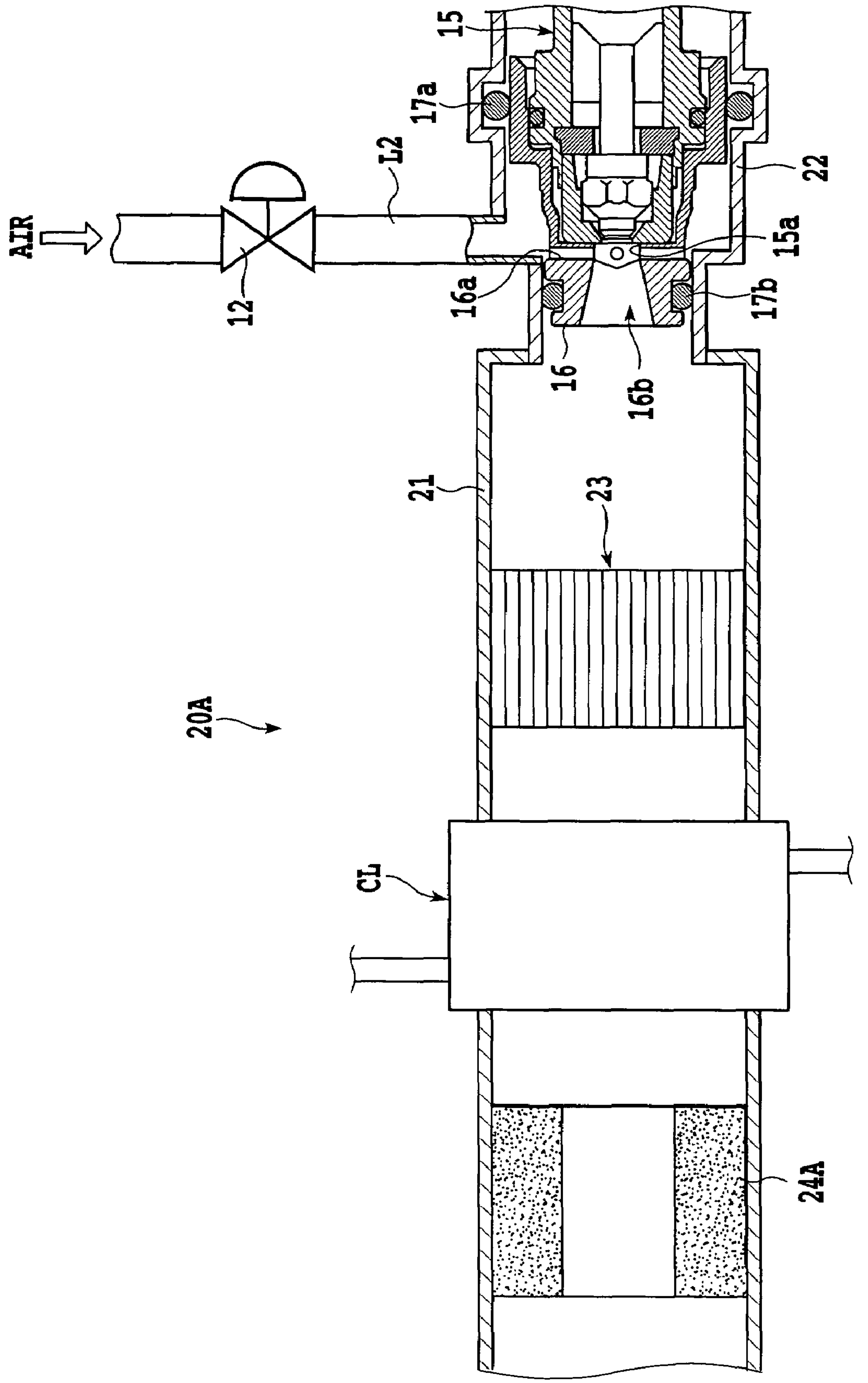
FIG. 4 is a partially sectional view illustrating an alteration of the fuel reforming apparatus according to the first embodiment of the present invention.

FIG. 4 is a partially sectional view illustrating an alteration of the first embodiment of the present invention. In a fuel reforming apparatus 20A of FIG. 4, an adsorbent member 24A serving as capturing means is a generally tubular honeycomb member which is coated with an adsorbent material (such as zeolite) for adsorbing the hydrocarbon component (non-reformed HC). The adsorbent member 24A is generally tubular and an outer circumference of the adsorbent member 24A is fixed to an inner circumference of the body 21.

Generally, a mixing degree of the hydrocarbon fuel and air in a fuel air mixture flowing into the reforming reaction section (reforming catalyst) 23 becomes better as being closer to a center (in the vicinity of an axial center of the body 21), while it becomes richer in fuel as being closer to the outer circumference. Also, since a temperature of the body 21 of the fuel reforming apparatus 20A is low upon the start of the fuel reforming operation, the non-reformed hydrocarbon fuel may be liquidized if the fuel air mixture is in contact with the inner circumference of the body 21.

In view of the foregoing, since there is more non-reformed fuel as being closer to the outer circumference of the body 21, it is possible to sufficiently capture the non-reformed fuel by using the tubular adsorbent member 24A as in the fuel reforming apparatus 20A. Thus, it is possible to reduce an amount of honeycomb member and adsorbent material such as zeolite constituting the adsorbent member 24A, so that a weight and a production cost of the fuel reforming apparatus 20A can be reduced.

(Second Embodiment)

A second embodiment of the present invention will be described below with reference to FIGS. 5 to 8. The same elements as those described with reference to the first embodiment are referred to same reference numerals and same description will be omitted.

Figure 5:
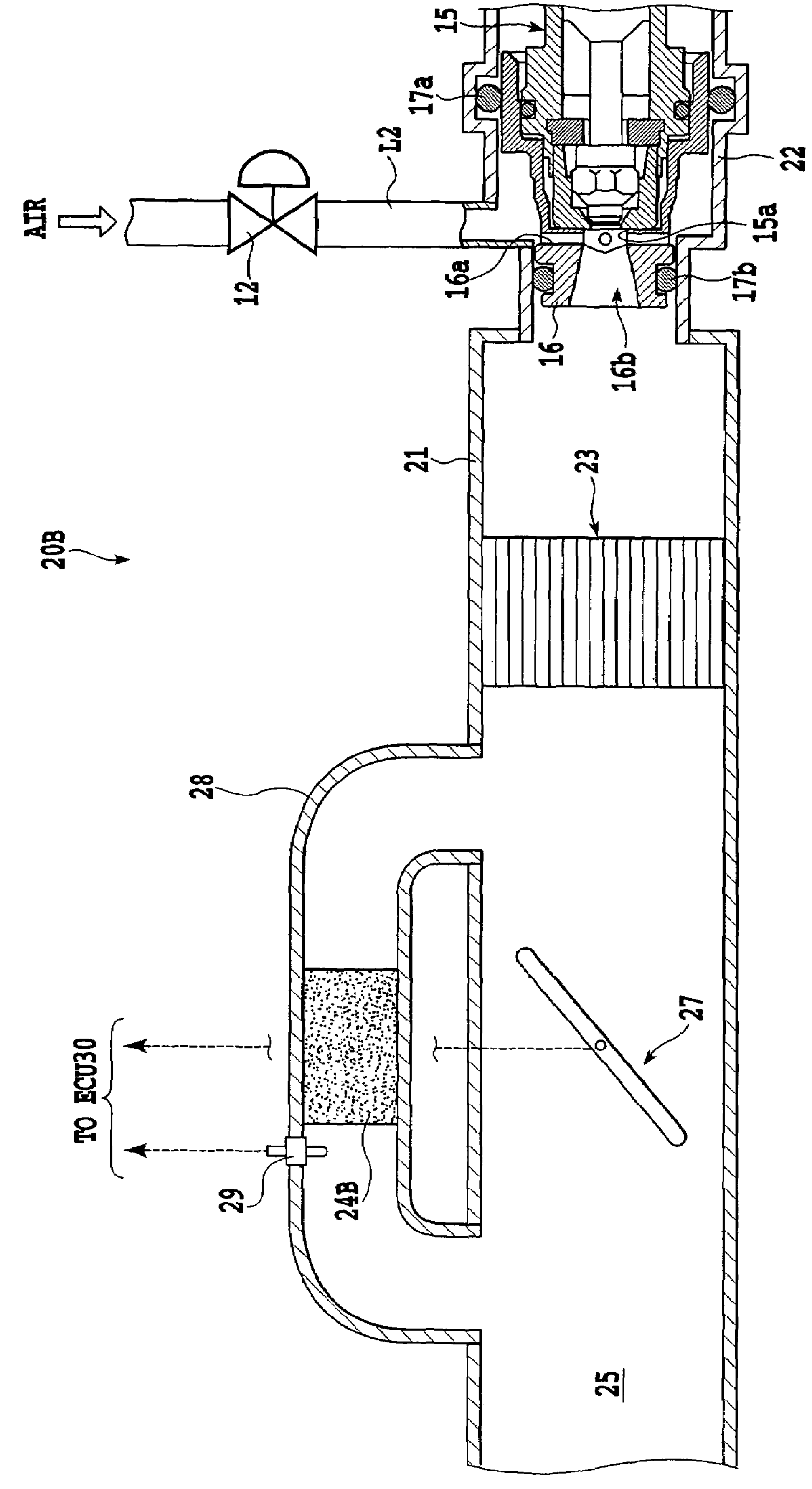
FIG. 5 is a partially sectional view of a fuel reforming apparatus according to a second embodiment of the present invention.

A fuel reforming apparatus 20B according to the second embodiment of the present invention shown in FIG. 5 includes an on-off valve or a shut off valve 27 disposed between the reforming reaction section 23 and the reformed fuel distribution chamber 25 in the interior of the body 21. The on-off valve 27 may be a motorized valve or the like of which opening degree is controllable. An actuator (not shown) of the on-off valve 27 is electrically connected to the ECU 30. A bypass pipe (a second passage) 28 is connected to the body 21 which define a first passage connecting the reforming reaction section 23 and the reformed fuel distribution chamber 25, so that the bypass pipe 28 bypasses part the body 21. That is, the bypass pipe 28 bypasses the on-off valve 27 and directly connects the reforming reaction section 23 and the reformed fuel distribution chamber 25. An adsorbent member 24B is disposed in the interior of the bypass pipe 28. The adsorbent member 24B is a honeycomb member which is coated with an adsorbent material (such as zeolite) for adsorbing the hydrocarbon component (non-reformed HC). Further, the bypass pipe 28 is provided with a temperature sensor 29 at a position directly downstream of the adsorbent member 24B. The temperature sensor 29 is electrically connected to the ECU 30. The temperature sensor 29 detects a temperature of the reformed fuel flowing out from the adsorbent member 24B and provides the ECU 30 with a signal indicating the detected value.

Figure 6:
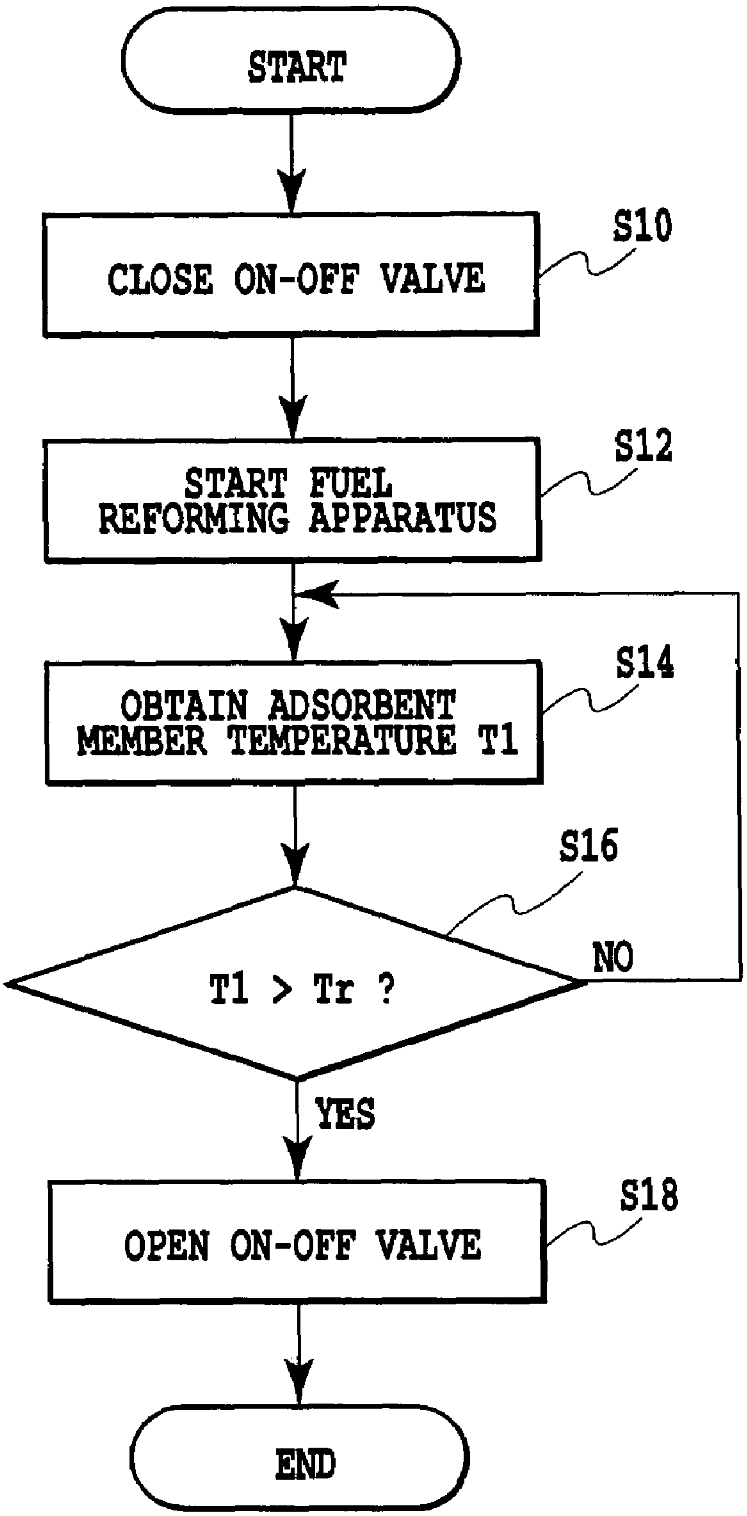
FIG. 6 is a flow chart for explaining an operation of the fuel reforming apparatus shown in FIG. 5.

The fuel reforming apparatus 20B is controlled by the ECU 30 in accordance with a procedure shown in FIG. 6. In this case, the ECU 30 makes the on-off valve 27 in the body 21 completely close prior to a start-up of the fuel reforming apparatus 20B (S10). After completely closing the on-off valve 27, the ECU 30 controls the fuel injection valve 15 to start a fuel injection into the fuel reforming apparatus 20B. Almost simultaneously therewith, the ECU 30 makes the on-off valve 12 open and makes the air pump 11 operate, so that air is supplied from the reforming air supply pipe L2 to the fuel reforming apparatus 20B (S12).

In such a manner, upon the start-up of the fuel reforming apparatus 20B, the on-off valve 27 is made to close and the reformed fuel and the like are introduced from the reforming reaction section (reforming catalyst) 23 only to the bypass pipe 28. Thus, a large amount of non-reformed fuel generally generated immediately after the start-up of the fuel reforming apparatus is captured by the adsorbent member 24B disposed in the bypass pipe 28, so that it is possible to prevent the non-reformed fuel from being supplied to the respective combustion chambers 3.

When the fuel reforming apparatus 20B is made to start at S12, the ECU 30 obtains (estimates) a temperature T1 of the adsorbent member 24B based on the signal from the temperature sensor 29 (S14). Further, the ECU 30 determines whether or not the temperature T1 of the adsorbent member 24B obtained at S14 exceeds a predetermined threshold value Tr (S16). The threshold value Tr used at S16 is lower than a temperature at which an adsorbent ability of the adsorbent member 24B is lost, so that it is possible to avoid the non-reformed fuel from not being adsorbed in the adsorbent member 24B.

If it is determined at S16 that the temperature T1 of the adsorbent member 24B exceeds the predetermined threshold value Tr, the ECU 30 makes the on-off valve 27 open in accordance with a predetermined condition of the opening degree of the valve 27 (S18). That is, if the temperature T1 of the adsorbent member 24B exceeds the predetermined threshold value Tr to stabilize an operational condition of the fuel reforming apparatus 20B, an amount of the non-reformed fuel decreases and the non-reformed fuel adsorbed in the adsorbent member 24B is released from the adsorbent member 24B as the temperature of the adsorbent member 24B rises. Accordingly, when the operation of the fuel reforming apparatus 20B is stabilized in such a manner, the on-off valve 27 is gradually made to open so that a flow rate of the reformed fuel flowing through the bypass pipe 28 reduces. Thus, it is possible to control a temperature rise of the adsorbent member 24B due to heat of the high temperature reformed fuel and to release the non-reformed fuel from the adsorbent member 24B little by little as the time lapses. As a result, according to the fuel reforming apparatus 20B, the discharge of HC or others from the engine 1 is suppressed.

When the on-off valve 27 is made to open at S18, the ECU 30 terminates the procedure of FIG. 6 (a start-up operation of the fuel reforming apparatus 20B), and starts a control of the fuel reforming apparatus 20B in a steady state. In addition, the description has been made in the above described fuel reforming apparatus 20B that the on-off valve 27 is made to open or close based on the temperature of the adsorbent member 24B. However, the present invention should not be limited to this. That is, as described later, the on-off valve 27 may be controlled based on the lapse of time from the start of the reforming reaction in the reforming reaction section 23. In such a case, the temperature sensor 29 may be omitted from the bypass pipe 28. Also, at S18 of FIG. 6, the on-off valve 27 may be gradually made to open instead of being instantaneously (at once) made to open.

Figure 7:
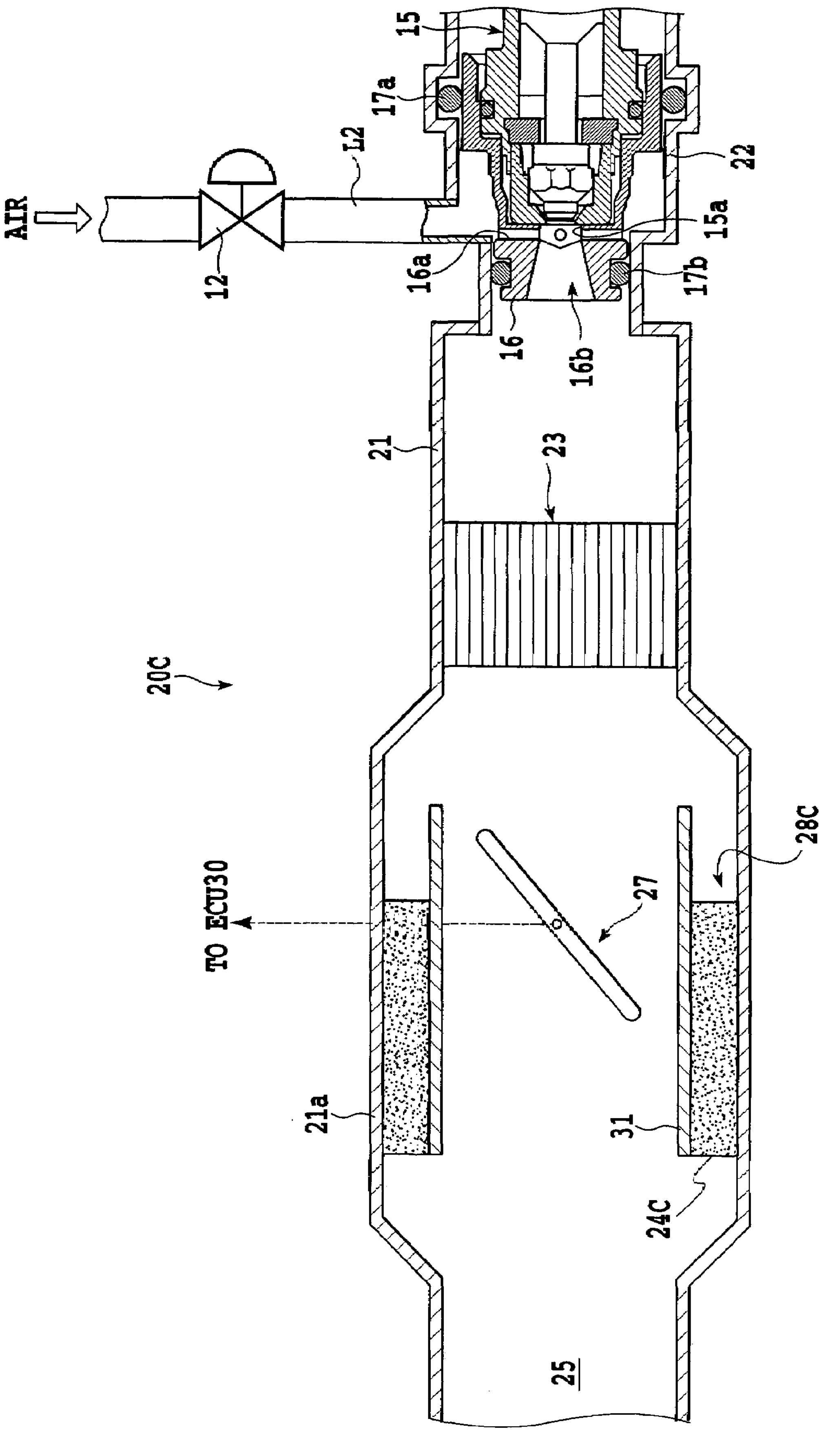
FIG. 7 is a partially sectional view illustrating an alteration of the fuel reforming apparatus according to the second embodiment of the present invention.

FIG. 7 is a partially sectional view illustrating an alteration of the fuel reforming apparatus according to the second embodiment of the present invention. In a fuel reforming apparatus 20C shown in FIG. 7, the body 21 is radially enlarged between the reforming reaction section 23 and the reformed fuel distribution chamber 25 to form a larger diametrical section 21a in which the on-off valve 27 is disposed. The on-off valve 27 may be a motorized valve or the like of which opening degree is controllable. An actuator (not shown) of the on-off valve 27 is electrically connected to the ECU 30.

In the interior of the body 21, a short tubular member 31 is disposed to surround the on-off valve 27. A total length of the tubular member 31 is shorter than that of the larger diametrical section 21*a* of the body 21. An outer diameter (a cross-sectional area) of the tubular member 31 is substantially equal to an outer diameter (a cross-sectional area) of the body 21 (other than the larger diametrical section 21*a*) and smaller than an inner diameter of the larger diametrical section 21*a*. The tubular member 31 is fixed to the body 21 via a tubular adsorbent member 24C which is positioned at a lengthwise center of the larger diametrical section 21*a*. The adsorbent member 24C is a honeycomb member coated with adsorbent material (for example, zeolite) for adsorbing hydrocarbon component (non-reformed HC). As shown in FIG. 7, the adsorbent member 24C is fixed to the body 21 while being offset to the reformed fuel distribution chamber 25.

In the fuel reforming apparatus 20C, the interior of the tubular member 31 defines a first passage connecting the reforming reaction section 23 and the reformed fuel distribution chamber 25. Further, the tubular member 31, i.e., the first passage is opened and closed by the on-off valve 27. Also, a bypass passage (a second passage) 28C bypassing part of the first passage (the on-off valve 27) is defined between the outer circumference of the tubular member 31 and the inner circumference of the body 21, and the adsorbent member 24C is disposed in the bypass passage 28. Further, a timer not shown is electrically connected to the ECU 30 of the engine with the fuel reforming apparatus 20C.

Figure 8:
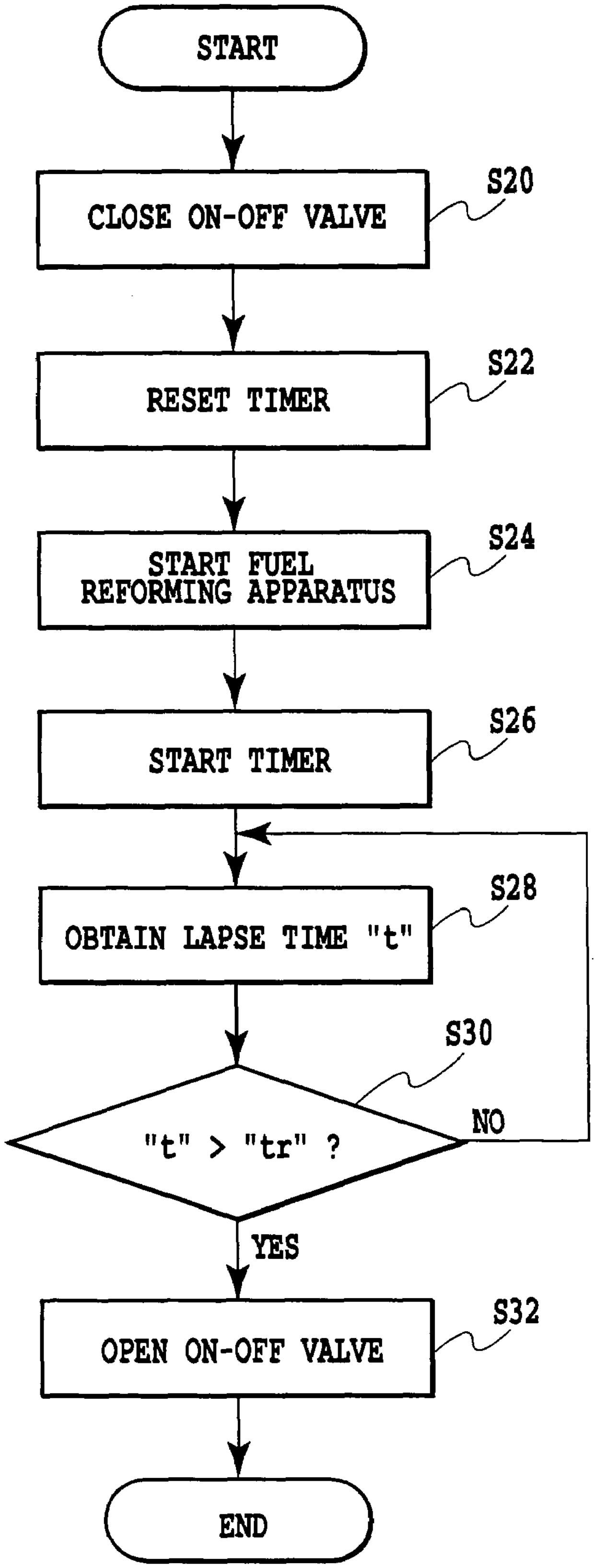
FIG. 8 is a flow chart for explaining an operation of the fuel reforming apparatus shown in FIG. 7.

The above described fuel reforming apparatus 20C is controlled by the ECU 30 in accordance with a procedure shown in FIG. 8. In this case, the ECU 30 makes the on-off valve 27 in the body 21 completely close prior to a start-up of the fuel reforming apparatus 20C (S20). After completely closing the on-off valve 27, the ECU 30 resets the above-mentioned timer (S22). Further, the ECU 30 controls the fuel injection valve 15 to start a fuel injection into the fuel reforming apparatus 20C. Almost simultaneously therewith, the ECU 30 makes the on-off valve 12 open and makes the air pump 11 operate, so that air is supplied from the reforming air supply pipe L2 to the fuel reforming apparatus 20C (S24).

As described above, in the fuel reforming apparatus 20C, the on-off valve 27 is made to close upon the start-up thereof, and the reformed fuel is introduced only into the bypass passage 28C from the reforming reaction section 23 (the reforming catalyst). Thus, a large amount of the non-reformed fuel generally generated immediately after the start-up of the fuel reforming apparatus is captured by the adsorbent member 24C disposed in the bypass passage 28C, so that it is possible to prevent the non-reformed fuel from being supplied to the respective chambers 3.

When the fuel reforming apparatus 20C is made to start at S24, the ECU 30 starts the timer substantially simultaneously therewith (S26). Then, the ECU 30 obtains a measurement time (lapse time) "t" of the timer (S28), and determines whether or not the obtained time "t" exceeds a predetermined threshold value "tr", i.e., whether or not a predetermined period has lapsed after the start-up of the fuel reforming apparatus 20C (S30). If it is determined at S30 that the measurement time "t" exceeds the threshold value "tr", the ECU 30 makes the on-off valve 27 open in accordance with a predetermined condition of the opening degree (S32).

That is, since an operation of the fuel reforming apparatus 20C is stabilized when the predetermined time has lapsed after the start-up of the fuel reforming apparatus 20C, an amount of the non-reformed fuel from the reforming reaction section 23 reduces. Further, when the predetermined time has lapsed after the start-up of the fuel reforming apparatus 20C, the temperature of the adsorbent member 24C becomes high, so that the non-reformed fuel adsorbed in the adsorbent member 24C is released from the adsorbent member 24C as the temperature of the adsorbent member 24C rises. Accordingly, by making the on-off valve 27 open when the operation of the fuel reforming apparatus 20C is stable so that a flow rate of the reformed fuel flowing through the bypass passage 28C reduces, it is possible to control a temperature rise of the adsorbent member 24C due to heat from the hot reformed fuel, and thus to release the non-reformed fuel little by little from the adsorbent member 24C as the time lapses. As a result, it is possible to prevent HC or others from discharging from the engine by the fuel reforming apparatus 20C.

When the on-off valve 27 is made to open at S32, the ECU 30 terminates the procedure of FIG. 8 (a start-up operation of the fuel reforming apparatus 20C), and starts a control of the fuel reforming apparatus 20C in a steady state. In addition, the description has been made in the above described fuel reforming apparatus 20C that the on-off valve 27 is made to open or close based on the lapse of time from the start of the reforming reaction in the reforming reaction section 23. However, the present invention should not be limited to this. That is, the timer may be omitted and the bypass passage 28C may be provided with a temperature sensor. In such a case, the on-off valve 27 may be controlled based on the temperature of the adsorbent member 24C detected by the temperature sensor. Also, at S32 of FIG. 8, the on-off valve 27 may be gradually made to open instead of being instantaneously (at once) made to open.

(Third Embodiment)

A third embodiment of the present invention will be described below with reference to FIGS. 9 to 14. The same elements as those described with reference to the first embodiment are referred to same reference numerals and same description will be omitted.

Figure 9:
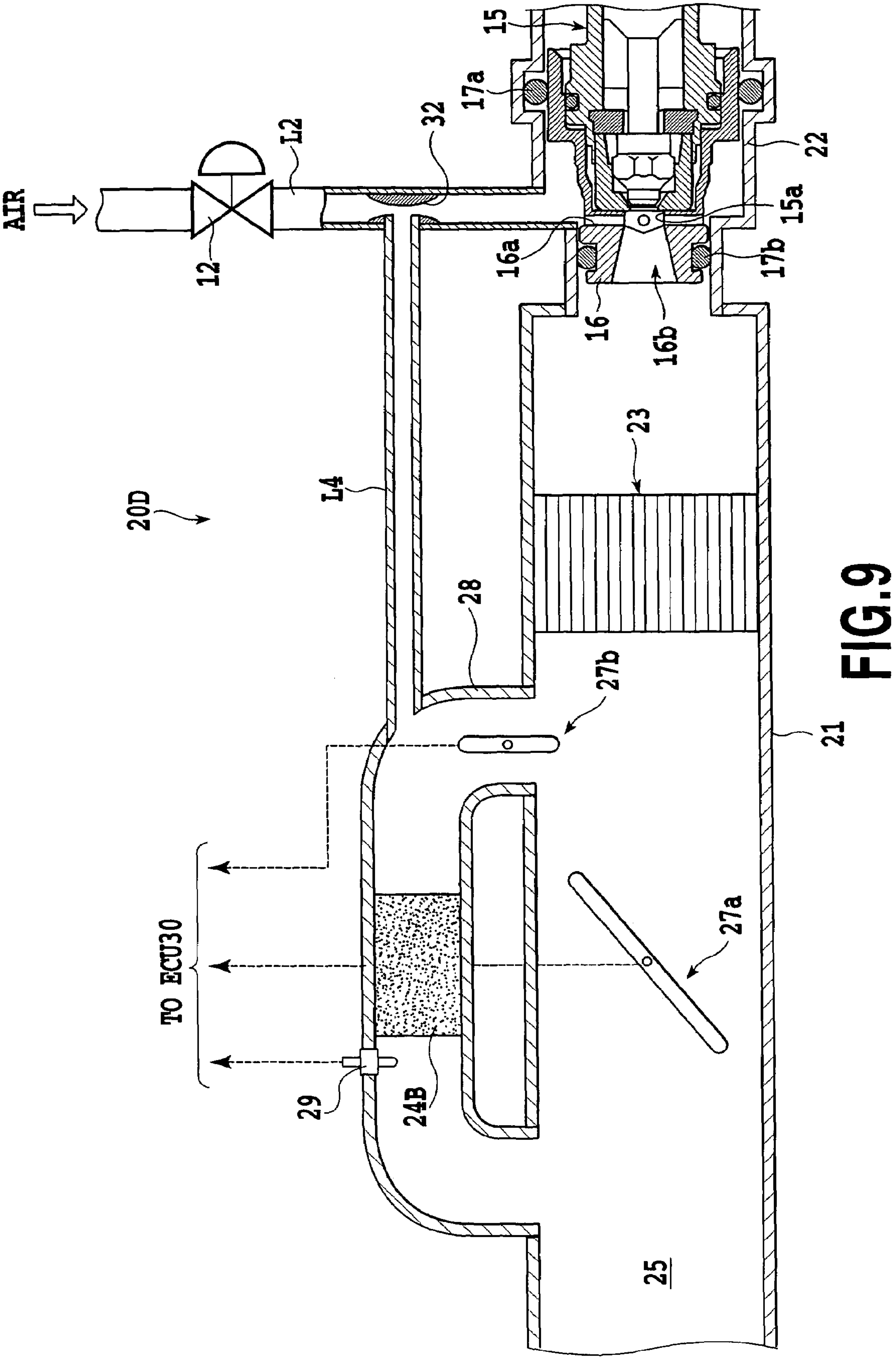
FIG. 9 is a partially sectional view of a fuel reforming apparatus according to a third embodiment of the present invention.

In comparison with the fuel reforming apparatus 20B of FIG. 5, a fuel reforming apparatus 20D shown in FIG. 9 further includes non-reformed fuel recovering means for recovering the non-reformed fuel captured by the adsorbent member (capturing means) 24B and supplying the non-reformed fuel again to the reforming reaction section (reforming catalyst) 23. According to the fuel reforming apparatus 20D, the non-reformed fuel is surely prevented from being supplied to the respective combustion chambers 3 and the non-reformed fuel captured by the adsorbent member 24B is recovered and effectively used again.

The detailed description of the fuel reforming apparatus 20D of FIG. 9 will be described in more detail below. The fuel reforming apparatus 20D includes a first on-off valve (shut off valve) 27*a* for opening and closing the body 21 which defines a first passage connecting the reforming reaction section 23 and the reformed fuel distribution chamber 25. Further, fuel reforming apparatus 20D includes a second on-off valve 27*b* for opening and closing an inlet of the bypass pipe 28 (a meeting point between the bypass pipe 28 and the body 21 on a side of the reforming reaction section 23). The first on-off valve 27*a* and the second on-off valve 27*b* may be a motorized valve and the like. Actuators (not shown) of the on-off valves 27*a* and 27*b* are electrically connected to the ECU 30.

One end of a purge pipe L4 is connected to the bypass pipe 28. In this embodiment, the purge pipe L4 is connected to the bypass pipe 28 between the second on-off valve 27*b* and the adsorbent member 24B. However, the purge pipe L4 may be connected to the bypass pipe 28 downstream of the adsorbent member 24B. On the other hand, a Venturi tube (negative pressure generating means) 32 is disposed in the interior of the reforming air supply pipe L2 for supplying air to the fuel reforming apparatus 20D between the on-off valve 12 and the valve accommodating section 22.

The Venturi tube 32 is formed as a tubular member having a narrowest portion (a throat) of the minimum inner diameter at a lengthwise center thereof. The other end of the above-mentioned purge pipe L4 penetrates the reforming air supplying pipe L2, and penetrates a lengthwise center of the Venturi tube 32 to confront the narrowest portion in the Venturi tube 32.

In this case, air delivered by the air pump 11 flows the interior of the Venturi tube 32 in the reforming air supply pipe L2, and a velocity of the air is highest in the vicinity of the narrowest portion of the Venturi tube 32 having the minimum inner diameter, i.e., in the vicinity of the connecting point (meeting point) with the purge pipe L4. Accordingly, the Venturi tube 32 serves as means for generating a negative pressure in the interior of the reforming air supply pipe L2 between the on-off valve 12 and the valve accommodating section 22.

Figure 10:
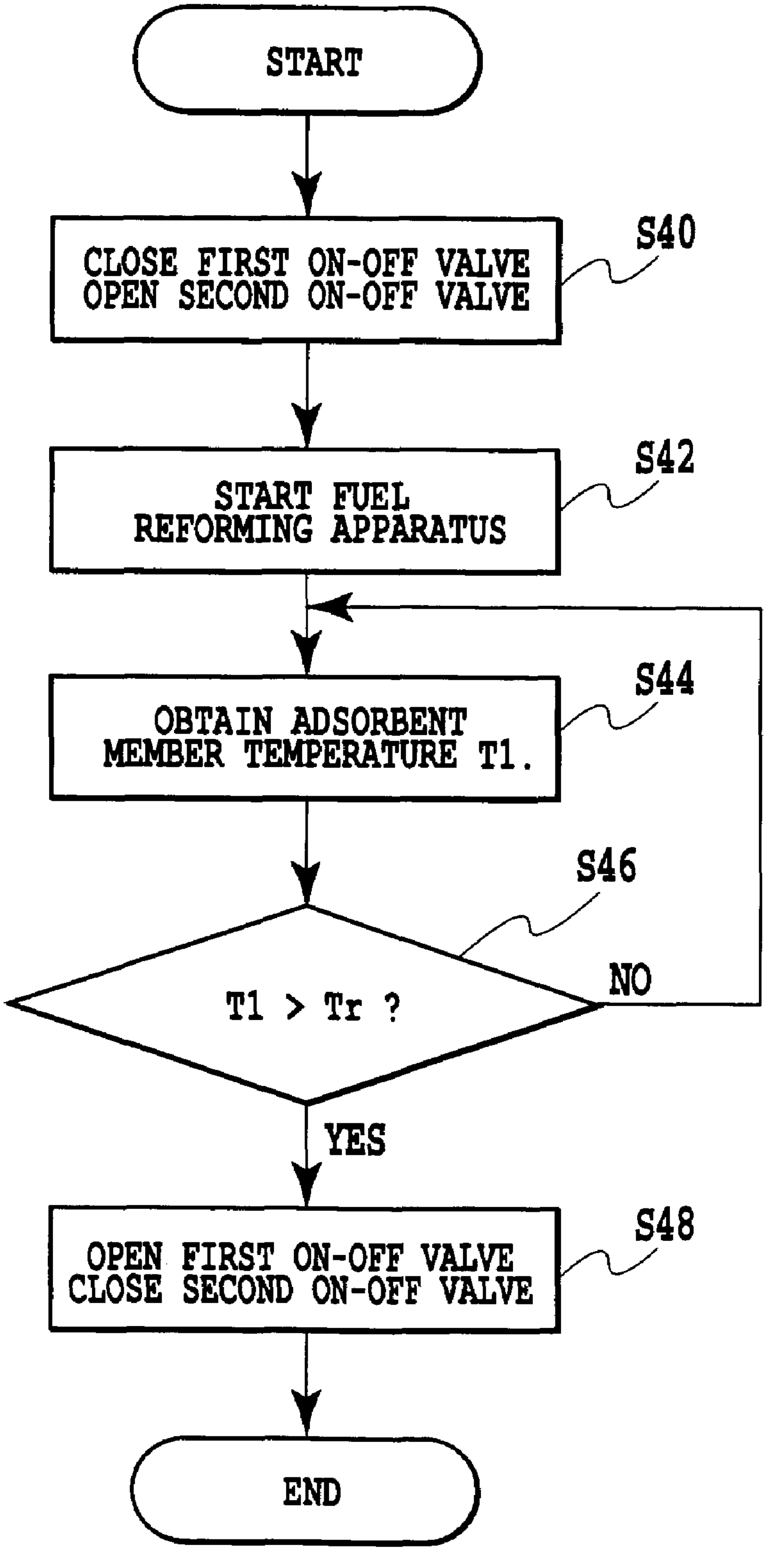
FIG. 10 is a flow chart for explaining an operation of the fuel reforming apparatus shown in FIG. 9.

The fuel reforming apparatus 20D is controlled by the ECU 30 in accordance with a procedure shown in FIG. 10. In this case, the ECU 30 makes the first on-off valve 27*a* disposed in the body 21 completely close, and makes the second on-off valve 27*b* disposed at the inlet of the bypass pipe 28 completely open (S40). Then, the ECU 30 controls the fuel injection valve 15 to start a fuel injection into the fuel reforming apparatus 20D. Almost simultaneously therewith, the ECU 30 makes the on-off valve 12 open and makes the air pump 11 operate, so that air is supplied from the reforming air supply pipe L2 to the fuel reforming apparatus 20D (S42).

In the fuel reforming apparatus 20D, upon the start-up thereof, the first on-off valve 27*a* is made to close and the second on-off valve 27*b* is made to open, so that the reformed fuel from the reforming reaction section (reforming catalyst) 23 is introduced only into the bypass pipe 28. Thus, a large amount of non-reformed fuel generally generated immediately after the start-up of the fuel reforming apparatus is captured by the adsorbent member 24B disposed in the bypass pipe 28, so that the non-reformed fuel is prevented from being supplied to the respective combustion chambers 3.

When the fuel reforming apparatus 20D is made to start at S42, the ECU 30 obtains (estimates) a temperature T1 of the adsorbent member 24B based on the signal from the temperature sensor 29 (S44). Further, the ECU 30 determines whether or not the temperature T1 of the adsorbent member 24B obtained at S44 exceeds a predetermined threshold value Tr (S46). The threshold value Tr is set at a value lower than a temperature at which an adsorbent ability of the adsorbent member 24B is lost, so that it is possible to avoid a situation in which the non-reformed fuel is not adsorbed in the adsorbent member 24B.

If it is determined at S46 that the temperature T1 exceeds the threshold value Tr, the ECU 30 makes the first on-off valve 27*a* open and makes the second on-off valve 27*b* close (S48). That is, if the temperature T1 of the adsorbent member 24B exceeds the threshold value Tr to stabilize the operation of the fuel reforming apparatus 20D, an amount of the non-reformed fuel decreases. Therefore, it is possible to prevent HC or others from being discharged from the engine 1 even if the adsorbent of the non-reformed fuel in the adsorbent member 24B is stopped. Also, since the negative pressure is generated in the vicinity of the inlet of the bypass pipe 28 by an operation of the Venturi tube 32 in the fuel reforming apparatus 20D as described above, the non-reformed fuel captured by the adsorbent member 24B is sucked into the reforming air supply pipe L2 when the second on-off valve 27*b* is closed to interrupt the reformed fuel to flow into the bypass pipe 28. The non-reformed fuel sucked into the reforming air supply pipe L2 is supplied again to the reforming reaction section 23 after being mixed with air. In such a manner, according to the fuel reforming apparatus 20D, it is possible to recover the non-reformed fuel captured by the adsorbent member 24B and effectively use the non-reformed fuel again.

When the process at S48 has completed, the ECU 30 terminates the procedure of FIG. 10 (a start-up operation of the fuel reforming apparatus 20D) and starts a control of the fuel reforming apparatus 20D in a steady state. In addition, the description has been made in the above described fuel reforming apparatus 20D that the on-off valves 27*a* and 27*b* are made to open or close based on the temperature of the adsorbent member 24B. However, the present invention should not be limited to this. That is, the on-off valves 27*a* and 27*b* may be controlled based on the lapse of time from the start of the reforming reaction in the reforming reaction section 23. In such a case, the temperature sensor 29 may be omitted from the bypass pipe 28.

Figure 11:
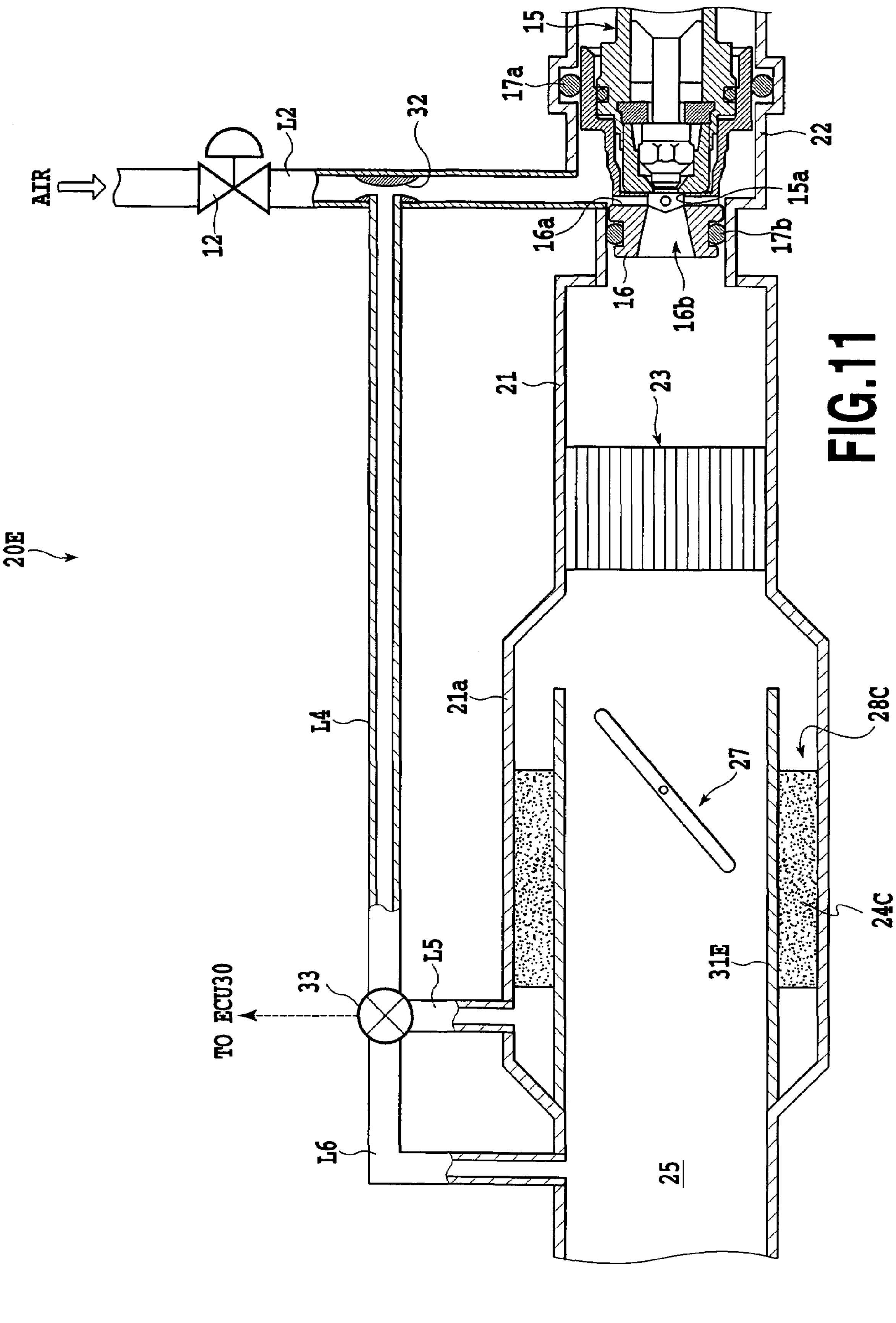
FIG. 11 is a partially sectional view illustrating an alteration of the fuel reforming apparatus according to the third embodiment of the present invention.

FIG. 11 is a partially sectional view of an alteration of the third embodiment according to the present invention. A fuel reforming apparatus 20E shown in FIG. 11 corresponds to the fuel reforming apparatus 20C of FIG. 7 further including means for recovering the non-reformed fuel captured by the adsorbent member (capturing means) 24C and supplying the non-reformed fuel again to the reforming reaction section (reforming catalyst) 23. By the fuel reforming apparatus 20E, it is possible to surely prevent the non-reformed fuel from being supplied to the respective combustion chambers 3, and to recover the non-reformed fuel captured by the adsorbent member 24C to effectively use the non-reformed fuel again.

The fuel reforming apparatus 20E of FIG. 11 will be described in more detail below. In the fuel reforming apparatus 20E, a tubular member 31E extends toward the reformed fuel distribution chamber 25 to close the downstream side end of the bypass passage 28C. One end of a connecting pipe L5 is connected to a closed space defined by the larger diametrical section 21*a* of the body 21, the tubular member 31E and the adsorbent member 24C. The other end of the connecting pipe L5 is connected to a first port of a three-way valve 33. Also, one end of a connecting pipe L6 is connected to a second port of the three-way valve 33. The other end of the connecting pipe L6 is connected to the body 21 at a position closer to the reformed fuel distribution chamber 25 rather than to the larger diametrical section 21*a*. Further, one end of the purge pipe L4 is connected to a third port of the three-way valve 33. The other end of the purge pipe L4 penetrates the reforming air supply pipe L2 and the lengthwise center of the Venturi tube 32 to confront the narrowest portion in the Venturi tube 32.

The three-way valve 33 is capable of switching passages between a bypass side and a purge side. If the three-way valve 33 is switched to the bypass side, the bypass passage 28*c* is connected to the interior of the body 21 (first passage) downstream of the larger diametrical section 21*a* via the connecting pipes L5 and L6. On the other hand, if the three-way valve 33 is switched to the purge side, the bypass passage 28C is connected to the reforming sir supply pipe L2 via the connecting pipe L5 and the purge pipe L4. The three-way valve 33 is electrically connected to the ECU 30 and controlled by the ECU 30. Also, a timer not shown is electrically connected to the ECU 30 for the engine with the fuel reforming apparatus 20E.

Figure 12:
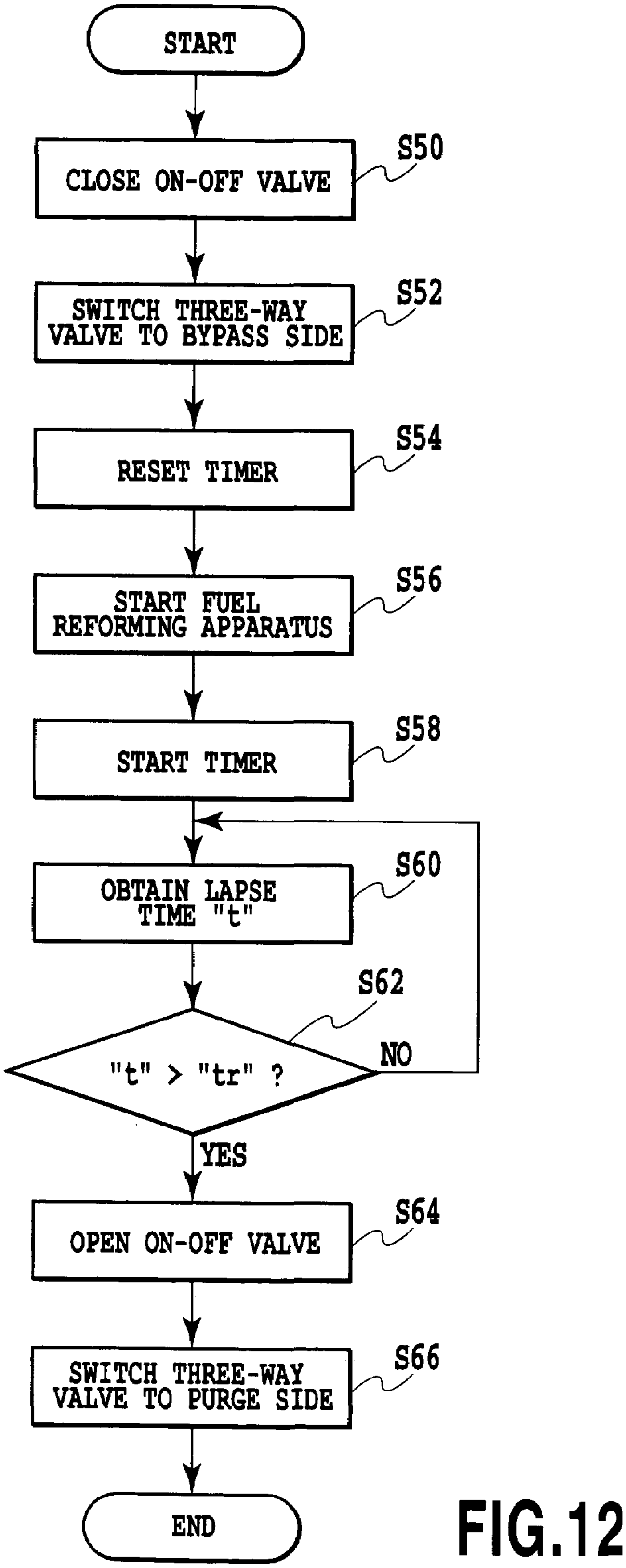
FIG. 12 is a flow chart for explaining an operation of the fuel reforming apparatus shown in FIG. 11.

The fuel reforming apparatus 20E is controlled by the ECU 30 in accordance with a procedure shown in FIG. 12. In this case, the ECU 30 makes the on-off valve 27 provided in the body 21 completely close prior to a start-up of the fuel reforming apparatus 20E (S50). After the on-off valve 27 has completely been closed, the ECU 30 switches the three-way valve 33 to the bypass side (S52). Thus, the bypass passage 28C is connected to the interior of the body 21 (the first passage) downstream of the larger diametrical section 21*a* via the connecting pipes L5 and L6. Then, the ECU 30 resets the above-mentioned timer (S54), and controls the fuel injection valve 15 to start a fuel injection into the fuel reforming apparatus 20E. Almost simultaneously therewith, the ECU 30 makes the on-off valve 12 open and makes the air pump 11 operate, so that air is supplied from the reforming air supply pipe L2 to the fuel reforming apparatus 20E (S56).

In the fuel reforming apparatus 20E, the on-off valve 27 is made to close upon the start-up thereof so as to allow the reformed fuel to be introduced from the reforming reaction section (reforming catalyst) 23 only to the bypass passage 28C. Thus, a large amount of non-reformed fuel generally generated immediately after the start-up of the fuel reforming apparatus is captured by the adsorbent member 24C disposed in the bypass passage 28C, so that it is possible to prevent the non-reformed fuel from being supplied to the respective combustion chambers 3. The reformed fuel passing through the adsorbent member 24C in the bypass passage 28C is returned into the interior of the body 21 via the connecting pipes L5, L6 and supplied to the reformed fuel distribution chamber 25.

When making the fuel reforming apparatus 20E start at S56, the ECU 30 starts the timer substantially simultaneously therewith (S58). The ECU 30 obtains a measurement time (lapse time) "t" of the timer (S60), and determines whether or not the time "t" thus obtained exceeds a predetermined threshold value "tr", that is, whether or not a predetermined period has lapsed after the start-up of the fuel reforming apparatus 20C (S62). If it is determined at S62 that the measurement time "t" exceeds the predetermined threshold value "tr", the ECU 30 makes the on-off valve 27 open (S64), and then, switches the three-way valve 33 to the purge side (S66).

That is, since the operation of the fuel reforming apparatus 20E is stabilized when the predetermined time has lapsed after the start-up of the fuel reforming apparatus 20E, an amount of non-reformed fuel reduces. Thus, it is possible to suppress the discharge of HC or others from the engine 1 even if the non-reformed fuel is not captured by the adsorbent member 24C. Further, in the fuel reforming apparatus 20E, a negative pressure is generated in the interior of a closed space defined by the larger diametrical section 21a, the tubular member 31E and the adsorbent member 24C via the purge pipe L4 and the connecting pipe L5 due to an operation of the Venturi tube 32, when the three-way valve 33 is switched to the purge side. Accordingly, the non-reformed fuel captured by the adsorbent member 24C is sucked into the reforming air supply pipe L2 via the connecting pipe L5 and the purge pipe L4. The non-reformed fuel sucked into the reforming air supply pipe L2 is supplied again to the reforming reaction section 23 after being mixed with air. As described above, in the fuel reforming apparatus 20E, it is possible to recover the non-reformed fuel captured by the adsorbent member 24C and effectively use the non-reformed fuel again.

After switching the three-way valve 33 to the purge side as S66, the ECU 30 terminates the procedure of FIG. 12 (a start-up operation of the fuel reforming apparatus 20E), and starts a control of the fuel reforming apparatus 20E in a steady state. In addition, the description has been made in the above described fuel reforming apparatus 20E that the on-off valve 27 and/or the three-way valve 33 are controlled based on the lapse of time from the start of the reforming reaction in the reforming reaction section 23. However, the present invention should not be limited to this. That is, the timer may be omitted and a temperature sensor may be disposed in the bypass passage 28C so that the on-off valve 27 and/or the three-way valve 33 may be controlled based on a temperature of the adsorbent member 24C detected by the temperature sensor.

Figure 13:
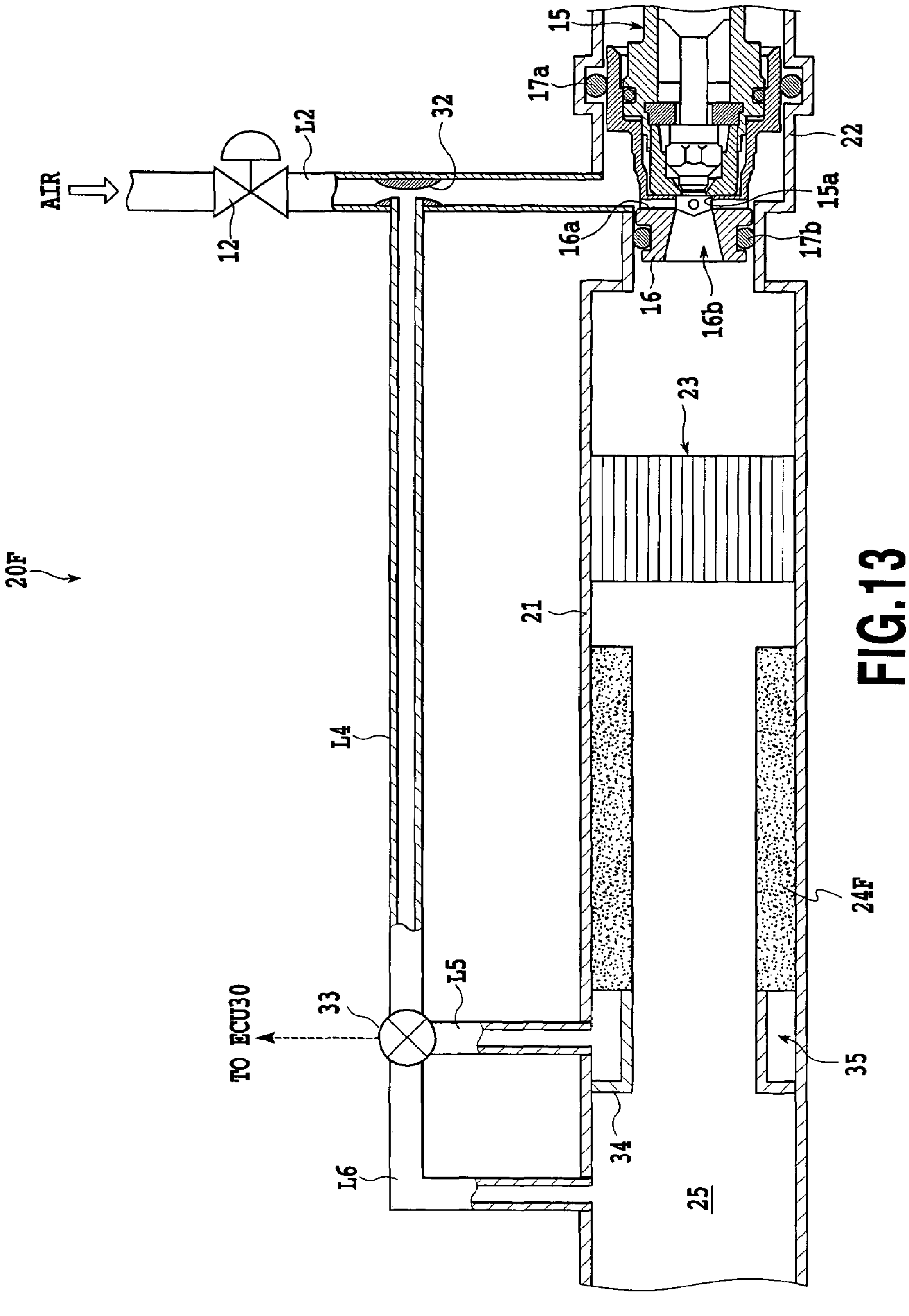
FIG. 13 is a partially sectional view illustrating another alteration of the fuel reforming apparatus according to the third embodiment of the present invention.

FIG. 13 is a partially sectional view of another alteration according to the third embodiment of the present invention. A fuel reforming apparatus 20F shown in FIG. 13 corresponds to the fuel reforming apparatus 20A of FIG. 4 further including means for recovering the non-reformed fuel captured by the capturing means and supplying the non-reformed fuel again to the reforming reaction section (reforming catalyst) 23. By the fuel reforming apparatus 20F, it is possible to surely prevent the non-reformed fuel from being supplied to the respective combustion chambers 3, and to recover the non-reformed fuel captured by the adsorbent member to effectively use the non-reformed fuel again. Since this fuel reforming apparatus 20F is relatively simple in construction, it can be formed at a lower cost without increasing a weight thereof.

The fuel reforming apparatus 20F of FIG. 13 will be described in more detail below. In this fuel reforming apparatus 20F, a tubular adsorbent member 24F which is a honeycomb member coated with adsorbent material (such as zeolite) for adsorbing hydrocarbon component (non-reformed HC) is disposed in the interior of the body 21 between the reforming reaction section (reforming catalyst) 23 and the reformed fuel distribution chamber 25. A closed space 35 is defined in the vicinity of a rear end of the adsorbent member 24F by the body 21, an annular member 34 fixed to the inner circumference of the body 21 and the adsorbent member 24F.

One end of the connecting pipe L5 is connected to the closed space 35. The other end of the connecting pipe L5 is connected to a first port of the three-way valve 33. One end of the connecting pipe L6 is connected to a second port of the three-way valve 33. The other end of the connecting pipe L6 is connected to the body 21 on a side closer to the reformed fuel distribution chamber 25 rather than to the closed space 35. Further, one end of the purge pipe L4 is connected to a third port of the three-way valve 33. The other end of the purge pipe L4 penetrates the reforming air supply pipe L2 and a lengthwise center of the Venturi tube 32 to confront the narrowest portion in the Venturi tube 32. As well as the fuel reforming apparatus 20E of FIG. 11, the three-way valve 33 is capable of switching passages between a bypass side and a purge side. Also, a timer not shown is connected to the ECU 30 of the engine with the fuel reforming apparatus 20F.

Figure 14:
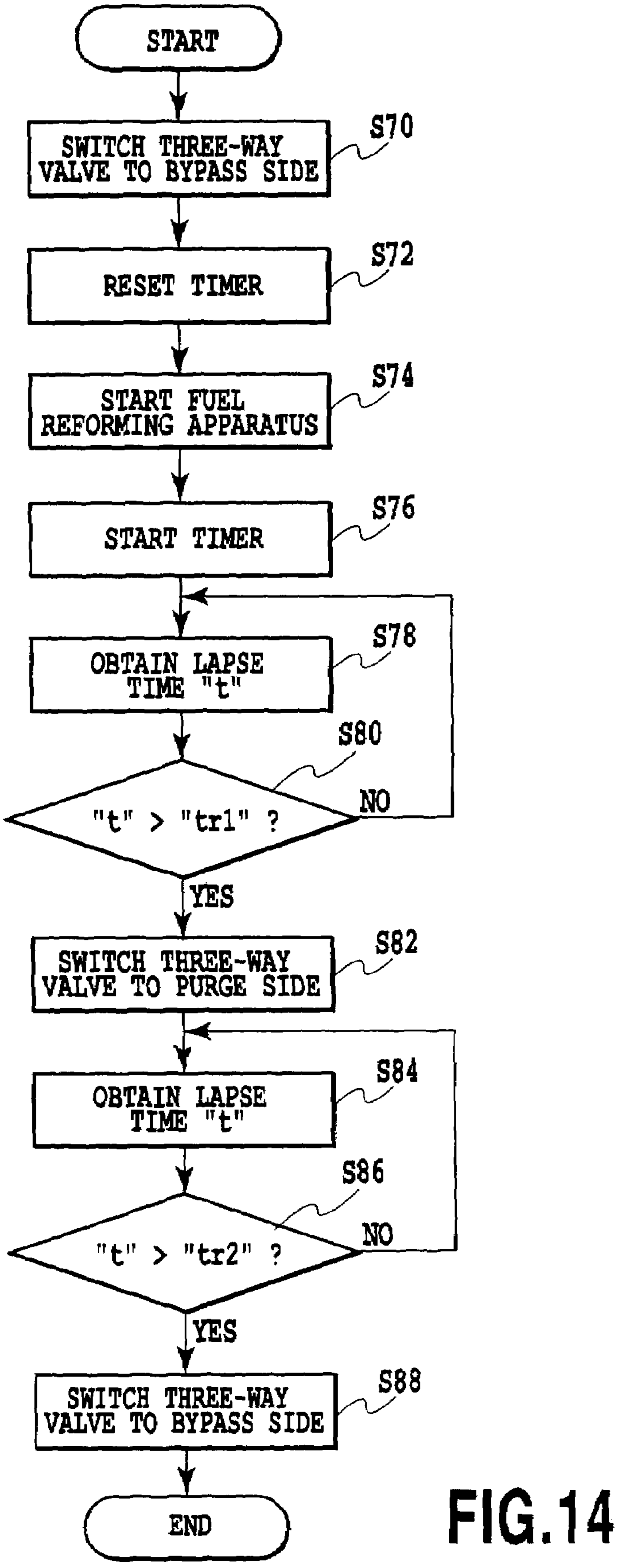
FIG. 14 is a flow chart for explaining an operation of the fuel reforming apparatus shown in FIG. 13.

The fuel reforming apparatus 20F is controlled by the ECU 30 in accordance with a procedure shown in FIG. 14. In this case, the ECU 30 switches the three-way valve 33 to the bypass side prior to a start-up of the fuel reforming apparatus 20F (S70). Thus, the closed space 35 is connected to the interior of the body 21 downstream thereof via the connecting pipes L5 and L6. Then, the ECU 30 resets the above-mentioned timer (S72), and controls the fuel injection valve 15 to start a fuel injection into the fuel reforming apparatus 20F. Almost simultaneously therewith, the ECU 30 makes the on-off valve 12 open and makes the air pump 11 operate, so that air is supplied from the reforming air supply pipe L2 to the fuel reforming apparatus 20F (S74). A large amount of non-reformed fuel generated immediately after the start of the operation of the fuel reforming apparatus is captured by the tubular adsorbent member 24F disposed in the interior of the body 21, so that it is possible to prevent the non-reformed fuel from being supplied to the respective combustion chambers 3.

When the fuel reforming apparatus 20F is made to start at S74, the ECU 30 starts the timer substantially simultaneously therewith (S76). The ECU 30 obtains a measurement time (lapse time) "t" of the timer (S78), and determines whether or not the obtained measurement time "t" exceeds a predetermined threshold value "tr1", that is, whether or not a predetermined time has lapsed after has been made to start 20F (S80). If it is determined that the measurement time "t" exceeds the predetermined threshold value "tr1", the ECU 30 switches the three-way valve 33 to the purge side (S82).

When the three-way valve 33 is switched to the purge side in such a manner, a negative pressure is generated in the interior of the closed space 35 via the purge pipe L4 and the connecting pipe L5 due to an operation of the Venturi tube 32. Thus, the non-reformed fuel captured by the adsorbent member 24F is sucked into the reforming air supply pipe L2 via the connecting pipe L5 and the purge pipe L4. The non-reformed fuel sucked into the reforming air supply pipe L2 is supplied again to the reforming reaction section 23 after being mixed with air. As a result, it is possible to recover the non-reformed fuel captured by the adsorbent member 24F and effectively use again in the fuel reforming apparatus 20F.

When switching the three-way valve 33 to the purge side at S82, the ECU 30 obtains the measurement time (lapse time) "t" of the timer (S84), and determines whether or not the measurement time "t" thus obtained exceeds a predetermined threshold value "tr2" (S86). If it is determined at S86 that the measurement time "t" exceeds the predetermined threshold value "tr2", the ECU 30 switches the three-way valve 33 again to the bypass side (S88). Thus, the reformed fuel (CO and $H_2$) produced by the reforming catalyst is prevented from being introduced again into the reforming catalyst via the purge pipe L4 and the like, in which CO and $H_2$ changes to $CO_{2\ and\ H2}O$ respectively.

When switching the three-way valve 33 to the bypass side at S88, the ECU 30 terminates the procedure of FIG. 14 (a start-up operation of the fuel reforming apparatus 20F) and starts a control of the fuel reforming apparatus 20F in a steady state. In addition, the description has been made in the above described fuel reforming apparatus 20F that the three-way valve 33 is controlled based on the time lapse from the start of the reforming reaction in the reforming reaction section 23. However, the present invention should not be limited to this. That is, the timer may be omitted and a temperature may be disposed in the vicinity of the adsorbent member 24F. In such a case, the three-way valve 33 may be controlled based on the temperature of the adsorbent member 24F detected by the temperature sensor.

(Fourth Embodiment)

A fourth embodiment of the present invention will be described below with reference to FIGS. 15 to 18. The same elements as those described with reference to the first embodiment are referred to same reference numerals and same description will be omitted.

Figure 15:
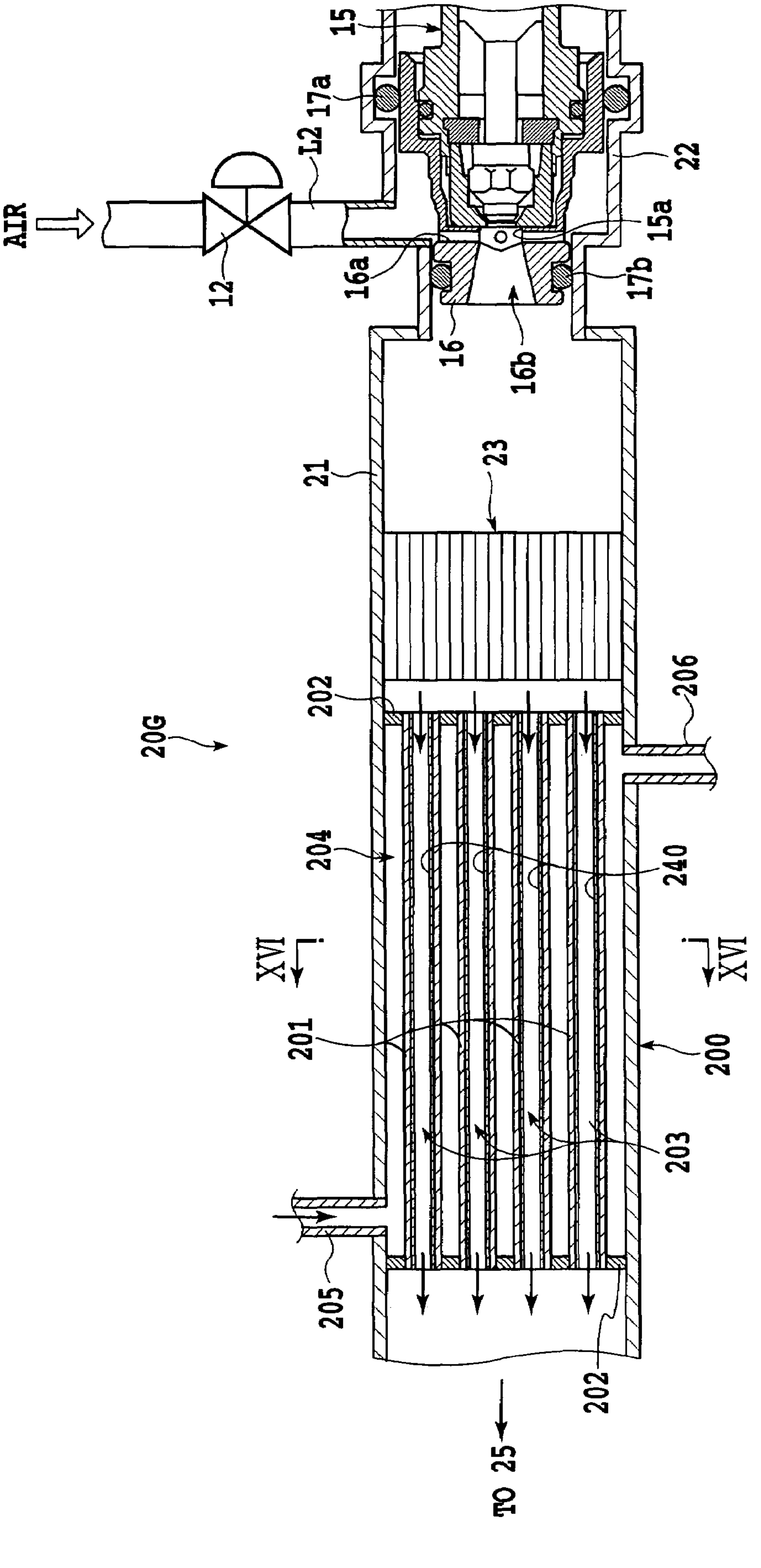
FIG. 15 is a partially sectional view of a fuel reforming apparatus according to a fourth embodiment of the present invention.
Figure 16:
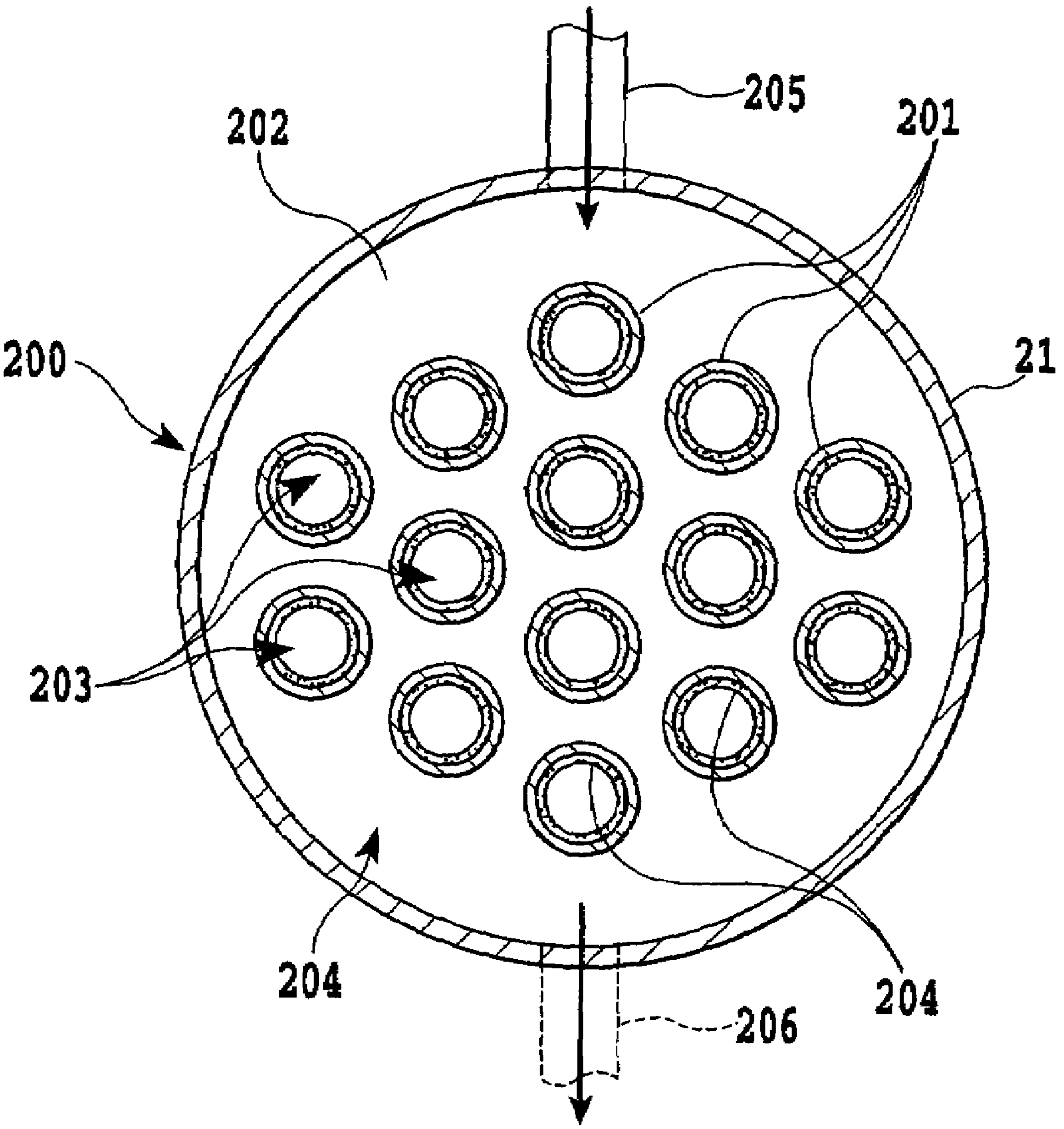
FIG. 16 is a sectional view taken along a line XVI—XVI in FIG. 15.

A fuel reforming apparatus 20G shown in FIG. 15 has a heat exchanger 200 between the reforming reaction section 23 and the reformed fuel distribution chamber 25. The heat exchanger 200 includes a plurality of reformed fuel flowing pipes 201 made of a heat-conductive material such as a metal and a pair of closure plates 202 as shown in FIGS. 15 and 16. The closure plates 202 respectively include the same number of holes as that of the reformed fuel flowing pipes 201, and are disposed at a predetermined interval for partitioning between the reforming reaction section 23 and the reformed fuel distribution chamber 25. Opposite ends the respective reformed fuel flowing pipes 201 are inserted into the holes of the respective closure plates 202 and fixed thereto.

Thus, a reformed fuel passage 203 for leading the reformed fuel flowing out from the reforming reaction section 23 to the reformed fuel distribution chamber (the reformed fuel supplying section) 25 is defined by the reformed fuel flowing pipe 201. Also, a coolant passage 204 is defined around the reformed fuel flowing pipes 201 by the body 21 and the respective closure plates 202. On the inner surface of the each of the reformed fuel flowing pipes 201, a coating layer 240 of adsorbent material (such as zeolite) for adsorbing hydrocarbon component (non-reformed HC) is applied.

Figure 17:
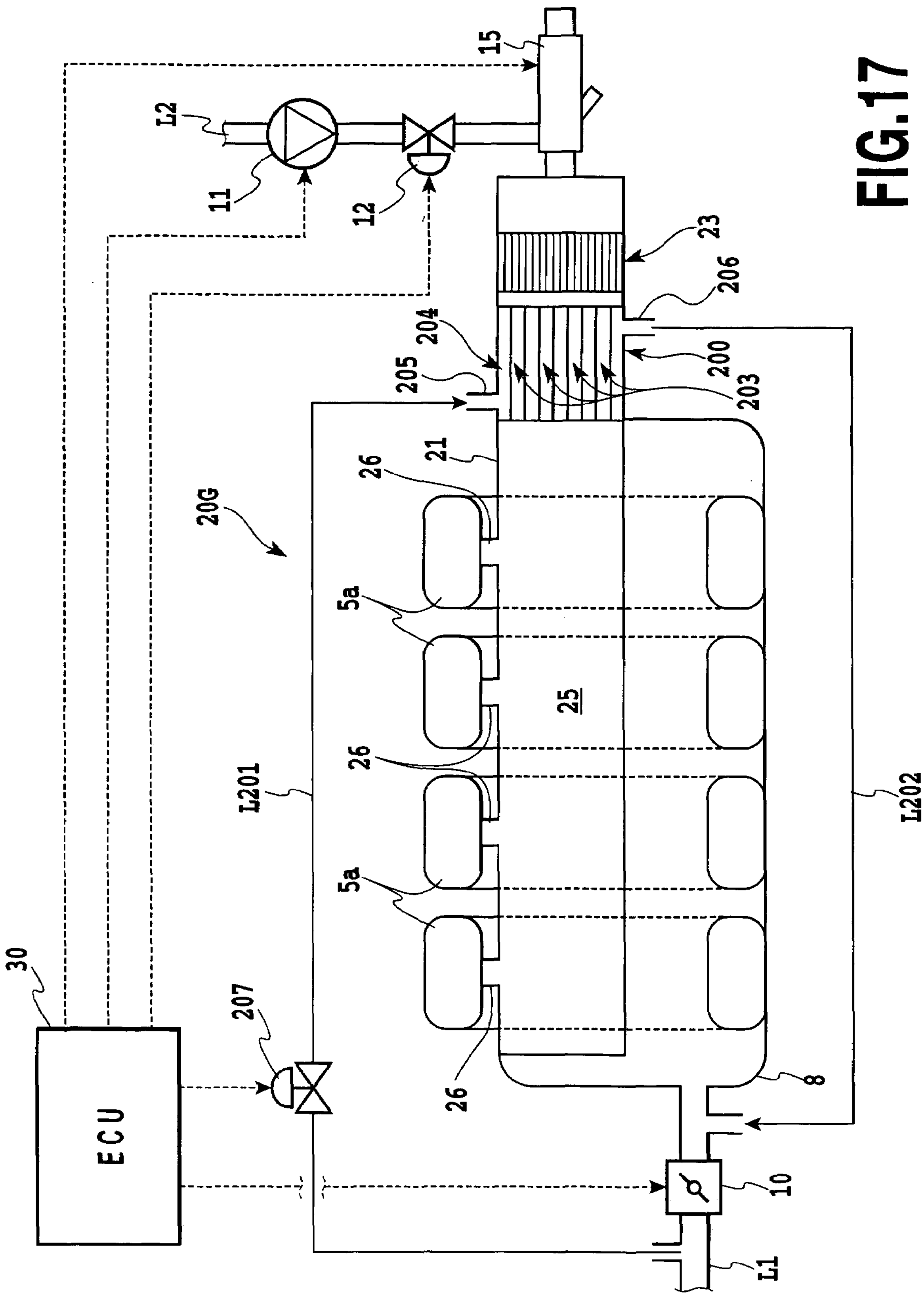
FIG. 17 is a schematic illustration of the fuel reforming apparatus according to the fourth embodiment of the present invention.

Further, the body 21 is provided with a coolant inlet 205 and a coolant outlet 206 respectively communicating with the coolant passage 204 of the body 21. As shown in FIG. 17, one end of an air feeding pipe L201 is connected to the coolant inlet 205, and the other end of the air feeding pipe L201 is connected to the air supply pipe L1 upstream of the throttle valve 10. The air feeding pipe L201 has a flow control valve 207 of which opening degree is controlled by the ECU 30 in the midway thereof.

One end of an air returning pipe L202 is connected to the coolant outlet 206, and the other end of the air returning pipe L202 is connected to the air supply pipe L1 between the throttle valve 10 and the surge tank 8. Thus, if the flow control valve 207 is made to open, part (or all) of air (sucked air) in the air supply pipe L1 is introduced into the coolant passage 204 of the heat exchanger 200, and returned to the air supply pipe L1 via the air returning pipe L202.

In the fuel reforming apparatus 20G, when the reformed fuel (reformed gas) containing fuel components CO and $H_2$ is produced in the reforming reaction section 23, the reformed fuel flows out from the reforming reaction section 23 to the respective reformed fuel flowing pipes 201 (the reformed fuel passages 203) of the heat exchanger 200, and brought into contact with the coating layer 240 of the adsorbent material applied to the inner surface of the respective reformed fuel flowing pipes 201. Thus, the non-reformed fuel (non-reformed HC) contained in the reformed fuel from the reforming reaction section 23 is surely captured (adsorbed) by the coating layer 240 of the adsorbent material.

During an operation of the fuel reforming apparatus 20G, the ECU 30 makes the flow control valve 207 of the air feeding pipe L201 open and controls the opening degree of the flow control valve 207 in accordance with a predetermined condition. Thus, part (or all) of the air taken into the air supply pipe L1 flows into the air feeding pipe L201, and is introduced into the coolant passage 204 of the hear exchanger 200 via the air feeding pipe L201. Air or a coolant flowing into the coolant passage 204 absorbs heat from the reformed fuel flowing through the respective reformed fuel flowing pipes 201 (the reformed fuel passage 203) and a temperature thereof becomes high. Then, the air in the coolant passage 204 is sucked into the interior of the air supply pipe L1 (the surge tank 8) via the air returning pipe L202.

In such a manner, the reformed fuel in each reformed fuel flowing pipe 201 is cooled in the fuel reforming apparatus 20G due to the heat exchange between the reformed fuel and air as the coolant, so that the temperature of the coating layer 240 in contact with the reformed fuel is surely prevented from excessively rising. Accordingly, it is possible to surely capture (adsorb) the non-reformed fuel contained in the reformed fuel from the reforming reaction section 23 by the coating layer 240 of the adsorbent material. Also, it is possible to release the non-reformed fuel thus captured from the coating layer 240 little by little as the time has lapsed.

As a result, according to the fuel reforming apparatus 20G, it is possible to prevent the non-reformed fuel from being supplied to the respective combustion chambers of the engine and to surely burn the non-reformed fuel in the respective combustion chamber. Thus, an exhaust emission reduces and the lean combustion range is enlarged to prevent NOx from increasing as well as the fuel consumption from deteriorating. Also, according to the fuel reforming apparatus 20G, hot air heated by the reformed fuel in the heat exchanger 200 is supplied to the respective combustion chambers. Thus, it is possible to accelerate the warm-up of the engine.

Further, according to the fuel reforming apparatus 20G, the coating layer 240 of the adsorbent material is substantially cooled by air as the coolant. Thus, it is possible to improve the durability of the coating layer 240. Since air is introduced into the coolant passage 204 of the heat exchanger 200 by using the negative pressure generated in the respective combustion chambers (the surge tank 8) in the fuel reforming apparatus 20G, it is unnecessary to use a power source such as an exclusive pump or others for introducing the heat transfer medium (air) into the heat exchanger.

Now, while a boiling point (a releasing temperature from the coating layer 240) of hydrocarbon fuel such as gasoline is approximately 200° C., air supplied to the coolant passage 204 of the heat exchanger 200 in the fuel reforming apparatus 20G is basically at an ordinary temperature. Accordingly, if air is always supplied to the heat exchanger 200 of the fuel reforming apparatus 20G via the air feeding pipe L201, in a certain operational condition of the fuel reforming apparatus 20G (the engine provided therewith), there may be a case in which it is difficult to raise the temperature of the coating layer 240 applied to the inner surface of the respective reformed fuel flowing pipes 201 to a value at which the non-reformed fuel is released from the coating layer 240.

In view of such points, when it is necessary to release the non-reformed fuel from the coating layer 240 or when a predetermined condition is established, the ECU 30 in this embodiment makes the flow control valve 207 in the air feeding pipe L201 close for a predetermined period. Thus, the heat exchange is not carried out between the reformed fuel and air in the heat exchanger 200 of the fuel reforming apparatus 20G. As a result, it is possible to raise the temperature of the coating layer 240 of the respective reformed fuel flowing pipes 201 by the heat of the reformed fuel from the reforming reaction section 23 so at to surely release the non-reformed fuel from the coating layer 240. In this case, if a closed time of the flow control valve 207 is limited (i.e., if it is not unnecessarily prolonged), it is possible to surely prevent the temperature of the coating layer 240 from excessively rising, thereby to favorably maintain the durability of the coating layer 240.

Figure 18:
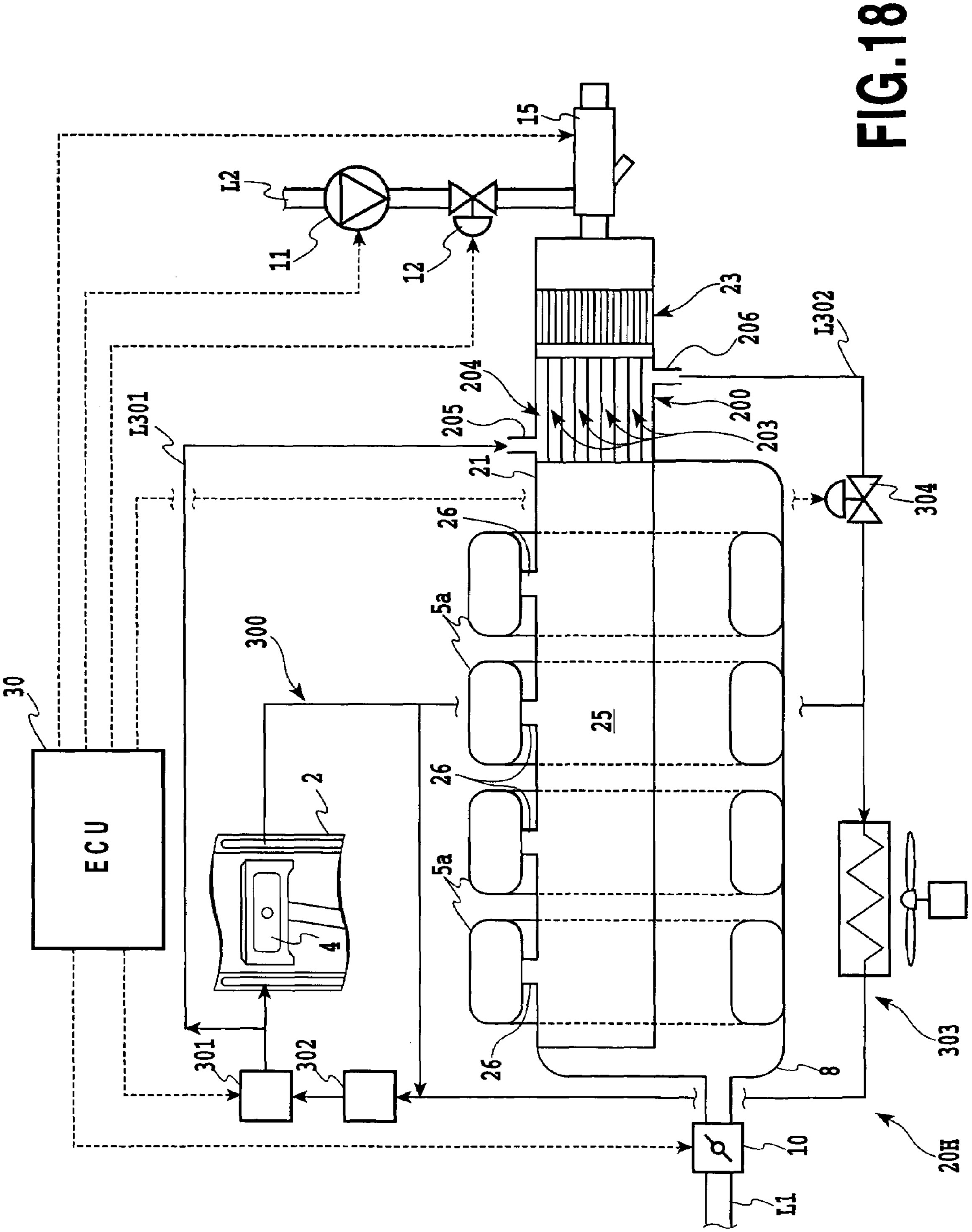
FIG. 18 is a schematic illustration of an alteration of the fuel reforming apparatus according to the fourth embodiment of the present invention.

FIG. 18 is a schematic illustration of an alteration of the fuel reforming apparatus according to the fourth embodiment of the present invention. While a fuel reforming apparatus 20H shown in FIG. 18 has a substantially the same structure as the above described fuel reforming apparatus 20G, an engine coolant from an engine cooling system 300 is supplied as a coolant to the heat exchanger 200 of the fuel reforming apparatus 20H, instead of sucked air.

As shown in FIG. 18, the engine cooling system 300 for circulating the engine coolant to the cylinder block 2 and the like includes an engine coolant pump 301, a thermostat 302 and a radiator 303. An engine coolant supply pipe L301 is branched from the engine cooling system 300 on an outlet side of the engine coolant pump 301. An end of the engine coolant supply pipe L301 is connected to the coolant inlet 205 of the heat exchanger 200 in the fuel reforming apparatus 20H. Also, one end of an engine coolant returning pipe L302 is connected to the coolant outlet 206 of the heat exchanger 200 in the fuel reforming apparatus 20H, and the other end of the engine coolant returning pipe L302 is connected to the engine cooling system 300 upstream of a inlet of the radiator 303. The engine coolant returning pipe L302 has a flow control valve 304 controlled by the ECU 30 in the midway thereof.

The ECU 30 makes the flow control valve 304 of the engine coolant returning pipe L302 open during an operation of the fuel reforming apparatus 20H of FIG. 18, and controls an opening degree of the flow control valve 304 in accordance with a predetermined condition. Thus, part of the engine coolant discharged from the engine coolant pump 301 flows into the engine coolant supply pipe L301 and is introduced into the coolant passage 204 of the heat exchanger 200 in the fuel reforming apparatus 20H via the engine coolant supply pipe L301. The engine coolant flowing into the coolant passage 204 is sent to the radiator 303 via the engine coolant returning pipe L302 after absorbing heat from the reformed fuel flowing through the respective reformed fuel passages 203 in the heat exchanger 200.

As described above, according to the fuel reforming apparatus 20H, the reformed fuel in the respective reformed fuel passages 203 is cooled by the heat exchange between the reformed fuel and the engine coolant. Therefore, it is possible to surely prevent the temperature of the coating layer in contact with the reformed fuel from excessively rising. Accordingly, it is possible to surely capture (adsorb) the non-reformed fuel contained in the reformed fuel from the reforming reaction section 23, and to release the non-reformed fuel from the coating layer little by little as the time has lapsed.

As a result, also in the fuel reforming apparatus 20H, the non-reformed fuel can be prevented from being supplied to the respective combustion chambers of the engine and combustion of the non-reformed fuel in the respective combustion chambers is assured. Thus, it is possible to reduce an exhaust emission and to enlarge a lean combustion range to prevent NOx from increasing as well as to avoid the deterioration of fuel consumption.

According to the fuel reforming apparatus 20H, since the coating layer of the adsorbent material is substantially cooled by the engine coolant as described above, the durability of the coating layer is improved. Also, in the fuel reforming apparatus 20H, since the engine coolant is introduced into the coolant passage 204 of the heat exchanger 200 by using the engine coolant pump 301, it is unnecessary to use an exclusive power source for introducing the heating medium into the heat exchanger.

Further, according to the fuel reforming apparatus 20H of FIG. 18, the flow control valve 304 in the engine coolant returning pipe L302 is closed for the predetermined period if there is a requirement for releasing the non-reformed fuel from the coating layer of the adsorbent material, or if the predetermined condition is established. Thus, the heat exchanging is not carried out between the reformed fuel and the engine coolant in the heat exchanger 200 of the fuel reforming apparatus 20H, so that it is possible to raise the temperature of the coating layer of the adsorbent material in the respective reformed fuel passages 203 by heat of the reformed fuel from the reforming reaction section 23 to surely release the non-reformed fuel from the coating layer. Also in this case, by limiting a period for closing the flow control valve 304, it is possible to surely prevent the temperature of the coating layer of the adsorbent material from excessively rising and favorably maintain the durability of the coating layer.

The present invention has been described in detail with respect to preferred embodiments, and it will now be apparent from the foregoing to those skilled in the art that changes and modifications may be made without departing from the invention in its broader aspect, and it is the intention, therefore, in the apparent claims to cover all such changes and modifications as fall within the true spirit of the invention.

What is claimed is:

1. A fuel reforming apparatus for reforming a fuel air mixture of a fuel and air, comprising:

a reforming catalyst for reforming said fuel air mixture;

a reformed fuel supply section for supplying a reformed fuel produced by said reforming catalyst to a predetermined object;

capturing means for capturing a non-reformed fuel, said capturing means being disposed between said reforming catalyst and said reformed fuel supply section; and cooling means for cooling said reformed fuel between said reforming catalyst and said capturing means, the cooling means being a heat exchanging means having a reformed fuel passage for leading said reformed fuel from said reforming catalyst to said reformed fuel supply section and a heating medium passage for circulating a heating medium to exchange heat between said heating medium and said reformed fuel flowing through said reformed fuel passage; and the capturing means being an adsorbent material for adsorbing said non-reformed fuel in said reformed fuel passage of said heat exchanging means.

2. The fuel reforming apparatus of claim 1, wherein said capturing means is disposed in an outer region of a passage connecting said reforming catalyst and said reformed fuel supply section.

3. The fuel reforming apparatus of claim 1, further comprising:

a first passage connecting said reforming catalyst and said reformed fuel supply section;

a second passage bypassing part of said first passage and connecting said reforming catalyst and said reformed fuel supply section; and opening/closing means for opening and closing said first passage, wherein said capturing means is disposed in said second passage and includes an adsorbent material for adsorbing said non-reformed fuel.

4. The fuel reforming apparatus of claim 3, wherein said second passage connecting a portion of said first passage upstream of said opening/closing means and a portion of said first passage downstream of said opening/closing means.

5. The fuel reforming apparatus of claim 4, wherein said second passage surrounds said first passage.

6. The fuel reforming apparatus of claim 3, wherein said opening/closing means is closed from a start of a fuel reforming operation in said reforming catalyst until a predetermined period has lapsed, or until said adsorbent material has reached a predetermined temperature.

7. The fuel reforming apparatus of claim 1, further comprising non-reformed fuel recovering means for recovering said non-reformed fuel captured by said capturing means and supplying said non-reformed fuel to said reforming catalyst again.

8. The fuel reforming apparatus of claim 7, wherein said non-reformed fuel recovering means comprises:

negative pressure generating means for generating a negative pressure by using a flow of air supplied to said reforming catalyst; and a passage connecting said negative pressure generating means and said capturing means.

9. The fuel reforming apparatus of claim 1, wherein said predetermined object is a combustion chamber of an internal combustion engine, and wherein said heating medium is part of air supplied to said combustion chamber.

10. A method of reforming a fuel air mixture of a fuel and air with a reforming catalyst, comprising:

providing a reformed fuel through a reformed fuel passage between the reforming catalyst and a reformed fuel supply section, for supplying a reformed fuel produced by the reforming catalyst to a predetermined object;

capturing a non-reformed fuel within said reformed fuel passage with an adsorbent material; and cooling said reformed fuel by a heat exchanging means having said reformed fuel passage and a heating medium passage for circulating a heating medium to exchange heat between said heating medium and said reformed fuel flowing through said reformed fuel passage.

11. The method of claim 10, further comprising:

cooling said reformed fuel between said reforming catalyst and a capturing means.

12. The method of claim 10, further comprising:

recovering said non-reformed fuel captured by said adsorbent material and supplying said non-reformed fuel to said reforming catalyst again.

* * * * *